(12) United States Patent
Nakayama et al.

(10) Patent No.: US 8,587,884 B2
(45) Date of Patent: Nov. 19, 2013

(54) IMAGING APPARATUS

(75) Inventors: Tatsuyuki Nakayama, Kanagawa (JP); Yu Numabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 111 days.

(21) Appl. No.: 13/280,956

(22) Filed: Oct. 25, 2011

(65) Prior Publication Data

US 2012/0162789 A1 Jun. 28, 2012

(30) Foreign Application Priority Data

Dec. 28, 2010 (JP) .................................. 2010-293692

(51) Int. Cl.
*G02B 15/14* (2006.01)
*G02B 7/02* (2006.01)

(52) U.S. Cl.
USPC ............................ 359/822; 359/694; 359/704

(58) Field of Classification Search
USPC .................. 359/694–704, 811–830
See application file for complete search history.

(56) References Cited

U.S. PATENT DOCUMENTS

| 4,879,596 A | 11/1989 | Miura et al. ..................... 348/47 |
| 7,649,695 B2* | 1/2010 | Koyama et al. ............... 359/701 |
| 8,094,391 B2* | 1/2012 | Fujiwara et al. .............. 359/824 |
| 8,120,694 B2* | 2/2012 | Takatsuka et al. ............ 348/340 |
| 8,248,722 B2* | 8/2012 | Hattori .......................... 359/827 |
| 2001/0030682 A1 | 10/2001 | Tserkovnyuk et al. ......... 348/47 |

FOREIGN PATENT DOCUMENTS

| JP | 2001-033900 | 2/2001 |
| JP | 2006-091177 A | 4/2006 |

OTHER PUBLICATIONS

Extended European Search Report issued Mar. 23, 2012 for corresponding European Application No. 11 18 8177.

* cited by examiner

*Primary Examiner* — Mohammed Hasan
(74) *Attorney, Agent, or Firm* — Rader, Fishman & Grauer PLLC

(57) ABSTRACT

An imaging apparatus includes a first lens barrel, a second lens barrel disposed side by side with the first lens barrel in a direction perpendicular to an optical axis of the first lens barrel, a reference metal sheet including a mounted surface portion mounted on a surface perpendicular to the optical axis of the first lens barrel and a reference surface portion facing an optical axis direction, an adjustment metal sheet including a base surface portion mounted on a surface perpendicular to an optical axis of the second lens barrel and an adjustment surface portion facing an optical axis direction and positioned side by side with the reference surface portion in state of being separated in the optical axis direction, and an adjustment section changing a direction of the adjustment surface portion to reference surface portion and adjusting a direction of optical axis of second lens barrel.

20 Claims, 20 Drawing Sheets

IMAGING APPARATUS

BACKGROUND

The present disclosure relates to a technical field with respect to an imaging apparatus. More particularly, the present disclosure relates to a technical field which adjusts, using a simple mechanism, the optical axes of a first lens barrel and a second lens barrel, which are disposed side by side in a direction perpendicular to an optical axis, to be parallel to each other and improves image quality without increasing manufacturing costs.

In various imaging apparatus such as a video camera or a still camera, a lens barrel, in which an optical system such as a lens is disposed in the inner portion is installed, and capturing is performed through the image of a subject being introduced via the optical system of the lens barrel.

In the imaging apparatus, in recent years, a type of imaging apparatus capable of capturing a stereoscopic image (three-dimensional image) has been suggested (for example, refer to Japanese Unexamined Patent Application Publication No. 2001-33900). In the imaging apparatus, two lens barrels are installed, and the capturing of the stereoscopic image is performed by simultaneously introducing the images of each subject via each optical system disposed at each lens barrel.

SUMMARY

However, in the image apparatus in which the stereoscopic image can be captured, since the capturing of the stereoscopic image is performed by simultaneously introducing the images of each subject via each optical system of the two lens barrels, it is necessary to parallelize the optical axes of both the lens barrels.

When the optical axes of both the lens barrels are not parallel to each other, there is a concern that the quality of the generated stereoscopic image may be decreased.

Accordingly, in the imaging apparatus, it is necessary to perform adjustment of the optical axis so as to parallelize the optical axes of both the lens barrels. However, it is preferable in terms of decreasing manufacturing costs that adjustment of the optical axis is performed using a simple adjustment mechanism.

In addition, in order to facilitate the decrease in manufacturing costs, it is preferable that collaboration of two lens barrels be improved.

Thus, it is desirable to adjust optical axes of a first lens barrel and a second lens barrel to be parallel to each other by a simple mechanism and improve image quality without increasing manufacturing costs in an imaging apparatus.

According to an embodiment of the present disclosure, there is provided an imaging apparatus including: a first lens barrel; a second lens barrel that is disposed side by side with the first lens barrel in a direction perpendicular to an optical axis of the first lens barrel; a reference metal sheet that includes a mounted surface portion mounted on a surface perpendicular to the optical axis of the first lens barrel and a reference surface portion facing an optical axis direction; an adjustment metal sheet that includes a base surface portion mounted on a surface perpendicular to an optical axis of the second lens barrel and an adjustment surface portion which faces an optical axis direction and is positioned side by side with the reference surface portion in a state of being separated in the optical axis direction; and an adjustment section that changes the direction of the adjustment surface portion with respect to the reference surface portion and adjusts the direction of the optical axis of the second lens barrel.

Accordingly, in the imaging apparatus, the direction of the adjustment surface portion with respect to the reference surface portion is changed by the adjustment section, and the optical axis of the first lens barrel and the optical axis of the second lens barrel are adjusted so as to be parallel to each other.

In the above-described imaging apparatus, the adjustment section may include a plurality of screw members which connects the reference surface portion and the adjustment surface portion, and a plurality of spring members which is disposed between the reference surface portion and the adjustment surface portion and biases the adjustment surface portion in a direction which is separated from the reference surface portion in the optical axis direction.

Due to the fact that the adjustment section may include a plurality of screw members which connects the reference surface portion and the adjustment surface portion and a plurality of spring members which biases the adjustment surface portion in a direction which is separated from the reference surface portion, configuration of the adjustment section becomes simple.

In the above-described imaging apparatus, the adjustment surface portion may include a fixing portion which is fixed to the reference surface portion by the screw member, a first connecting portion which is connected to the reference surface portion by the screw member, and a second connecting portion which is connected to the reference surface portion by the screw member, the spring member may be disposed between the first connecting portion and the reference surface portion, and the spring member may be disposed between the second connecting portion and the reference surface portion.

Due to the adjustment surface portion including the fixing portion, the first connecting portion, and the second connecting portion, the spring member being disposed between the first connecting portion and the reference surface portion, and the spring member being disposed between the second connecting portion and the reference surface portion, the spring member is not disposed between the fixing portion and the reference surface portion.

In the above-described imaging apparatus, when a line connecting a center of the screw member fastened to the fixing portion and a center of the screw member fastened to the first connecting portion is a first line, and a line connecting a center of the screw member fastened to the fixing portion and a center of the screw member fastened to the second connecting portion is a second line, the first line and the second line may be perpendicular to each other.

Due to the fact that the first line and the second line are perpendicular to each other, the optical axis adjustment in a first direction does not interfere with the optical axis adjustment in a second direction, and the optical axis adjustment in the second direction does not interfere with the optical axis adjustment in the first direction.

In the above-described imaging apparatus, the length of the first line may be the same as that of the second line.

Due to the length of the first line being the same as that of the second line, variation of the optical axis with respect to the adjustment amount regarding the optical axis adjustment in the first direction, and the optical axis adjustment in the second direction are the same as each other.

In the above-described imaging apparatus, a compression coil spring may be used as the spring member, and the screw member may be inserted and penetrated into the spring member.

Due to the fact that the compression coil spring is used as the spring member and the screw member is inserted and penetrated to the spring member, the spring member is held to the screw member.

In the above-described imaging apparatus, a slit, a notch, or a groove may be formed in a periphery of the fixing portion in the second lens barrel.

Due to the slit, the notch, or the groove being formed in the periphery of the fixing portion in the second lens barrel, the adjustment surface portion is easily bent so as to make the fixing portion be the supporting point in the optical axis adjustment.

In the above-described imaging apparatus, a slit, a notch, or a groove may be formed on the first line or the second line, or the first line and the second line in the second lens barrel.

Due to the slit, the notch, or the groove being formed on the first line or the second line, or the first line and the second line in the second lens barrel, improved flexibility of the adjustment surface portion is secured, In the above-described imaging apparatus, the adjustment surface portion may include a first connecting portion which is connected to the reference surface portion by the screw member, a second connecting portion which is connected to the reference surface portion by the screw member, and a third connecting portion which is connected to the reference surface portion by the screw member, the spring member may be disposed between the first connecting portion and the reference surface portion, the spring member may be disposed between the second connecting portion and the reference surface portion, and the spring member may be disposed between the third connecting portion and the reference surface portion.

Due to the adjustment surface portion including the first connecting portion, the second connecting portion, and the third connecting portion, and each spring member being disposed between each connecting portion and the reference surface portion, the position adjustment of the second lens barrel in the optical axis direction can be performed.

In the above-described imaging apparatus, the adjustment section may include a plurality of screw members which connects the reference surface portion and the adjustment surface portion, and a plurality of spacers which is disposed between the reference surface portion and the adjustment surface portion, interposed between the reference surface portion and the adjustment surface portion, and each has a predetermined thickness in the interposing direction.

Due to the adjustment section including a plurality of the screw members which connects the reference surface portion and the adjustment surface portion and a plurality of the spacers which is interposed between the reference surface portion and the adjustment surface portion, configuration of the adjustment section becomes simple.

In the above-described imaging apparatus, the adjustment surface portion may include a fixing portion which is fixed to the reference surface portion by the screw member, a first connecting portion which is connected to the reference surface portion by the screw member, and a second connecting portion which is connected to the reference surface portion by the screw member, the spacer may be disposed between the first connecting portion and the reference surface portion, and the spacer may be disposed between the second connecting portion and the reference surface portion.

Due to the adjustment surface portion including the fixing portion, the first connecting portion, and the second connecting portion, the spacer being disposed between the first connecting portion and the reference surface portion, and the spacer being disposed between the second connecting portion and the reference surface portion, the spacer is disposed between the fixing portion and the reference surface portion.

In the above-described imaging apparatus, the adjustment surface portion may include a first connecting portion which is connected to the reference surface portion by the screw member, a second connecting portion which is connected to the reference surface portion by the screw member, and a third connecting portion which is connected to the reference surface portion by the screw member, the spacer may be disposed between the first connecting portion and the reference surface portion, the spacer may be disposed between the second connecting portion and the reference surface portion, and the spacer may be disposed between the third connecting portion and the reference surface portion.

Due to the adjustment surface portion including the first connecting portion, the second connecting portion, and the third connecting portion, and each spacer being disposed between each connecting portion and the reference surface portion, the position adjustment of the second lens barrel in the optical axis direction can be performed.

In an imaging apparatus according to the embodiment of the present disclosure, the imaging apparatus includes: a first lens barrel; a second lens barrel that is disposed side by side with the first lens barrel in a direction perpendicular to an optical axis of the first lens barrel; a reference metal sheet that includes an mounted surface portion mounted on a surface perpendicular to the optical axis of the first lens barrel and a reference surface portion facing an optical axis direction; an adjustment metal sheet that includes a base surface portion mounted on a surface perpendicular to an optical axis of the second lens barrel and an adjustment surface portion which faces an optical axis direction and is positioned side by side with the reference surface portion in a state of being separated in the optical axis direction; and an adjustment section that changes the direction of the adjustment surface portion with respect to the reference surface portion and adjusts the direction of the optical axis of the second lens barrel.

Accordingly, since the direction of the adjustment surface portion with respect to the reference surface portion is changed and the direction of the optical axis of the second lens barrel is adjusted, the optical axis adjustment can be performed by simple adjustment mechanism, image quality can be improved without increasing manufacturing costs.

In addition, since the reference metal sheet and the adjustment metal sheet each are mounted on the surface perpendicular to the optical axis of the first lens barrel and the surface perpendicular to the optical axis of the second lens barrel, the first lens barrel and the second lens barrel can use the same as each other, and therefore, reduction of the manufacturing cost can be improved.

In the imaging apparatus, the adjustment section includes a plurality of screw members which connects the reference surface portion and the adjustment surface portion, and a plurality of spring members which is disposed between the reference surface portion and the adjustment surface portion and biases the adjustment surface portion in a direction which is separated from the reference surface portion in the optical axis direction.

Accordingly, the optical axis adjustment of the second lens barrel can be performed by simple configuration, and the optical axis adjustment of the second lens barrel can be performed without increasing manufacturing costs.

In the imaging apparatus, the adjustment surface portion includes a fixing portion which is fixed to the reference surface portion by the screw member, a first connecting portion which is connected to the reference surface portion by the screw member, and a second connecting portion which is connected to the reference surface portion by the screw member, the spring member is disposed between the first connecting portion and the reference surface portion, and the spring member is disposed between the second connecting portion and the reference surface portion.

Accordingly, since the spring member is not disposed between the fixing portion of the adjustment surface portion and the reference surface portion, the optical axis adjustment of the second lens barrel can be performed while decreasing the number of parts.

In the imaging apparatus, when a line connecting a center of the screw member fastened to the fixing portion and a center of the screw member fastened to the first connecting portion is a first line, and a line connecting a center of the screw member fastened to the fixing portion and a center of the screw member fastened to the second connecting portion is a second line, the first line and the second line is perpendicular to each other.

Accordingly, the optical axis adjustment in the first direction does not interfere with the optical axis adjustment in the second direction, and the optical axis adjustment in the second direction does not interfere with the optical axis adjustment in the first direction. Therefore, mutual interference in the optical axis adjustment is avoided, and accuracy in the optical axis adjustment can be improved.

In the imaging apparatus, the length of the first line is the same as that of the second line.

Accordingly, variation of the optical axis with respect to the adjustment amount regarding the optical axis adjustment in the first direction and the optical axis adjustment in the second direction are the same as each other, and the optical axis adjustment can be easily performed.

In the imaging apparatus, a compression coil spring is used as the spring member, and the screw member is inserted and penetrated to the spring member.

Accordingly, even when an impact due to dropping or the like occurs, falling out of the spring member can be prevented.

In the imaging apparatus, a slit, a notch, or a groove is formed in the periphery of the fixing portion in the second lens barrel.

Accordingly, the adjustment surface portion is easily bent so as to make the fixing portion be the supporting point in the optical adjustment, and the optical axis adjustment can be easily performed.

In the imaging apparatus, a slit, a notch, or a groove is formed on the first line or the second line, or the first line and the second line in the second lens barrel.

Accordingly, improved flexibility of the adjustment surface portion can be secured, and the optical axis adjustment can be further easily performed.

In the imaging apparatus, the adjustment surface portion includes a first connecting portion which is connected to the reference surface portion by the screw member, a second connecting portion which is connected to the reference surface portion by the screw member, and a third connecting portion which is connected to the reference surface portion by the screw member, the spring member is disposed between the first connecting portion and the reference surface portion, the spring member is disposed between the second connecting portion and the reference surface portion, and the spring member is disposed between the third connecting portion and the reference surface portion.

Accordingly, the position adjustment of the second lens barrel in the optical axis direction can be performed, and the position accuracy between the first lens barrel and the second lens barrel can be improved.

In the imaging apparatus, wherein when a line connecting a center of the screw member fastened to the third connecting portion and a center of the screw member fastened to the first connecting portion is a first line, and a line connecting a center of the screw member fastened to the third connecting portion and a center of the screw member fastened to the second connecting portion is a second line, the first line and the second line are perpendicular to each other.

Accordingly, the optical axis adjustment in the first direction does not interfere with the optical axis adjustment in the second direction, and the optical axis adjustment in the second direction does not interfere with the optical axis adjustment in the first direction. Therefore, mutual interference in the optical axis adjustment is avoided, and accuracy in the optical axis adjustment can be improved.

In the imaging apparatus, the length of the first line is the same as that of the second line.

Accordingly, variation of the optical axis with respect to the adjustment amount regarding the optical axis adjustment in the first direction and the optical axis adjustment in the second direction are the same as each other, and the optical axis adjustment can be easily performed.

In the imaging apparatus, the adjustment section includes a plurality of screw members which connects the reference surface portion and the adjustment surface portion, and a plurality of spacers which is disposed between the reference surface portion and the adjustment surface portion, interposed between the reference surface portion and the adjustment surface portion, and each has a predetermined thickness in the interposing direction.

Accordingly, the optical axis adjustment of the second lens barrel can be performed by simple configuration, and the optical axis adjustment of the second lens barrel can be performed without increasing manufacturing costs.

In the imaging apparatus, the adjustment surface portion includes a fixing portion which is fixed to the reference surface portion by the screw member, a first connecting portion which is connected to the reference surface portion by the screw member, and a second connecting portion which is connected to the reference surface portion by the screw member, the spacer is disposed between the first connecting portion and the reference surface portion, and the spacer is disposed between the second connecting portion and the reference surface portion. Accordingly, since the spacer is not disposed between the fixing portion of the adjustment surface portion and the reference surface portion, the optical axis adjustment of the second lens barrel can be performed while decreasing the number of parts.

In the imaging apparatus, when a line connecting a center of the screw member fastened to the fixing portion and a center of the screw member fastened to the first connecting portion is a first line, and a line connecting a center of the screw member fastened to the fixing portion and a center of the screw member fastened to the second connecting portion is a second line, the first line and the second line are perpendicular to each other.

Accordingly, the optical axis adjustment in the first direction does not interfere with the optical axis adjustment in the second direction, and the optical axis adjustment in the second direction does not interfere with the optical axis adjustment in the first direction. Therefore, mutual interference in the optical axis adjustment is avoided, and accuracy in the optical axis adjustment can be improved.

In the imaging apparatus, the length of the first line is the same as that of the second line.

Accordingly, variation of the optical axis with respect to the adjustment amount regarding the optical axis adjustment in the first direction and the optical axis adjustment in the second direction are the same as each other, and the optical axis adjustment can be easily performed.

In the imaging apparatus, a slit, a notch, or a groove is formed in the periphery of the fixing portion in the second lens barrel.

Accordingly, the adjustment surface portion is easily bent so as to make the fixing portion be the supporting point in the optical axis adjustment, and the optical axis adjustment can be easily performed.

In the imaging apparatus, a slit, a notch, or a groove is formed on the first line or the second line, or the first line and the second line in the second lens barrel.

Accordingly, improved flexibility of the adjustment surface portion can be secured, and the optical axis adjustment can be further easily performed.

In the imaging apparatus, the adjustment surface portion includes a first connecting portion which is connected to the reference surface portion by the screw member, a second connecting portion which is connected to the reference surface portion by the screw member, and a third connecting portion which is connected to the reference surface portion by the screw member, the spacer is disposed between the first connecting portion and the reference surface portion, the spacer is disposed between the second connecting portion and the reference surface portion, and the spacer is disposed between the third connecting portion and the reference surface portion.

Accordingly, the position adjustment of the second lens barrel in the optical axis direction can be performed, and the position accuracy between the first lens barrel and the second lens barrel can be improved.

In the imaging apparatus, when a line connecting a center of the screw member fastened to the third connecting portion and a center of the screw member fastened to the first connecting portion is a first line, and a line connecting a center of the screw member fastened to the third connecting portion and a center of the screw member fastened to the second connecting portion is a second line, the first line and the second line are perpendicular to each other.

Accordingly, the optical axis adjustment in the first direction does not interfere with the optical axis adjustment in the second direction, and the optical axis adjustment in the second direction does not interfere with the optical axis adjustment in the first direction. Therefore, mutual interference in the optical axis adjustment is avoided, and accuracy in the optical axis adjustment can be improved.

In the imaging apparatus, the length of the first line is the same as that of the second line.

Accordingly, variation of the optical axis with respect to the adjustment amount regarding the optical axis adjustment in the first direction and the optical axis adjustment in the second direction are the same as each other, and the optical axis adjustment can be easily performed.

DETAILED DESCRIPTION OF EMBODIMENTS

Hereinafter, embodiments of the present disclosure will be described with reference to the accompanying drawings.

Embodiments described hereinafter are examples in which an imaging apparatus of the present disclosure is applied to a video camera. In addition, an application range of the present disclosure is not limited to the video camera, for example, can be widely applied to various imaging devices which are incorporated to a still camera or other equipment.

In the description hereinafter, front, rear, up, down, left, and right directions are defined as viewed from the photographer during capturing with a video camera. Accordingly, the subject side becomes the front side, and the photographer side becomes the rear side.

Moreover, the front, rear, up, down, left, and right directions described hereinafter are for ease of the explanation, and embodiments of the present disclosure are not limited to these directions.

First Embodiment

Configuration of Imaging Apparatus

First, configuration of an imaging apparatus 1 in a first embodiment will be described.

Figure 1:
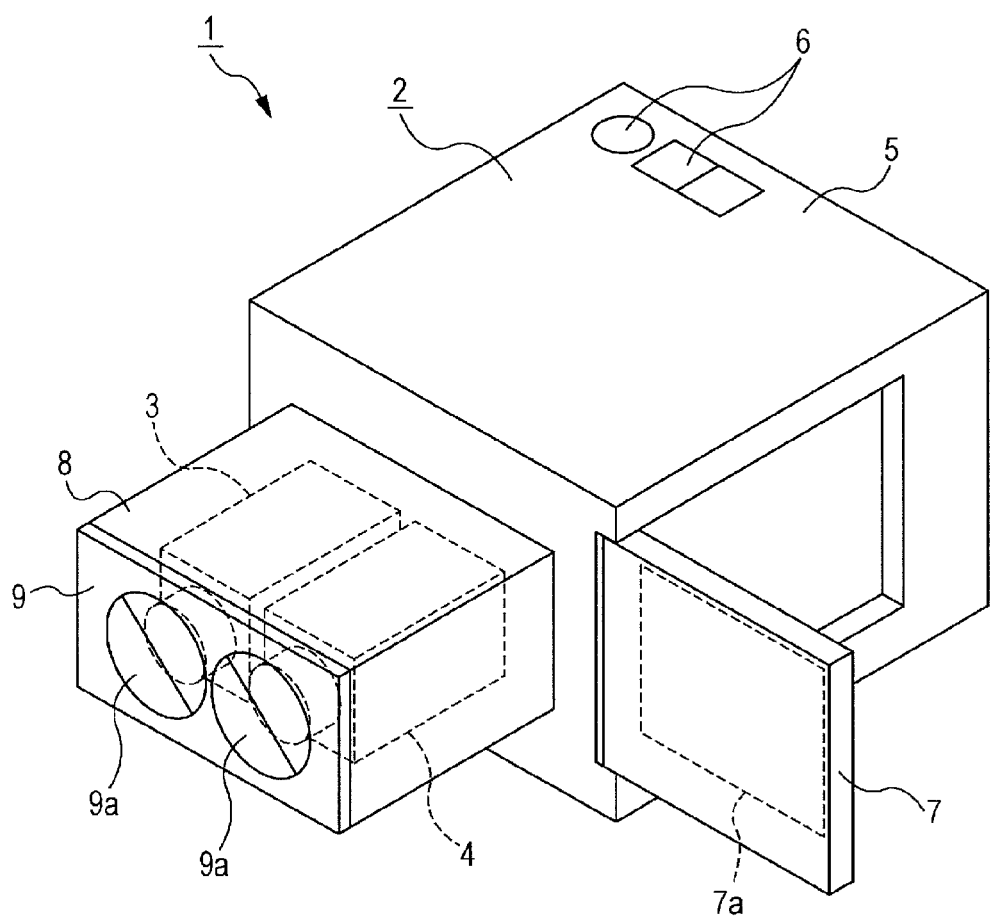
FIG. 1 illustrates a preferred embodiment of the present disclosure along with FIGS. 2 to 22, and is a schematic perspective view illustrating an imaging apparatus.

The imaging apparatus 1 includes a main body 2 of the apparatus and a first lens barrel 3 and a second lens barrel 4 which are disposed at the front surface of the main body 2 of the apparatus (refer to FIG. 1).

The main body 2 of the apparatus is constituted so that necessary each portion is disposed in an inner portion of a case 5, and operating portions 6, 6, ... are disposed on the outer peripheral surface of the case 5. For example, the operating portion 6, 6, ... includes a power switch, a recording button, a zoom switch, a mode switching knob, or the like.

A display panel 7 is connected so as to be freely opened and closed to the side surface of the main body 2 of the apparatus. For example, the display panel 7 includes a liquid crystal display as a display portion 7a.

For example, the first lens barrel 3 and the second lens barrel 4 are disposed in an inner portion of a case body 8 in a state where both the lens barrels 3 and 4 are combined side by side in the left and right. The case body 8 is formed as a cylinder shape in which the axis direction is the front and rear direction, and the rear end of the case body is combined with the front surface of the case body 2.

As the first lens barrel 3 and the second lens barrel 4, the same those which are formed in the same size and shape as each other are used.

A lens barrier 9 is mounted on the front end of the case body 8. The lens barrier 9 includes opening and closing members 9a and 9a which are disposed side by side in the left and right direction, and the first lens barrel 3 and the second lens barrel 4 each are opened and closed by operating the opening and closing members 9a and 9a.

Figure 2:
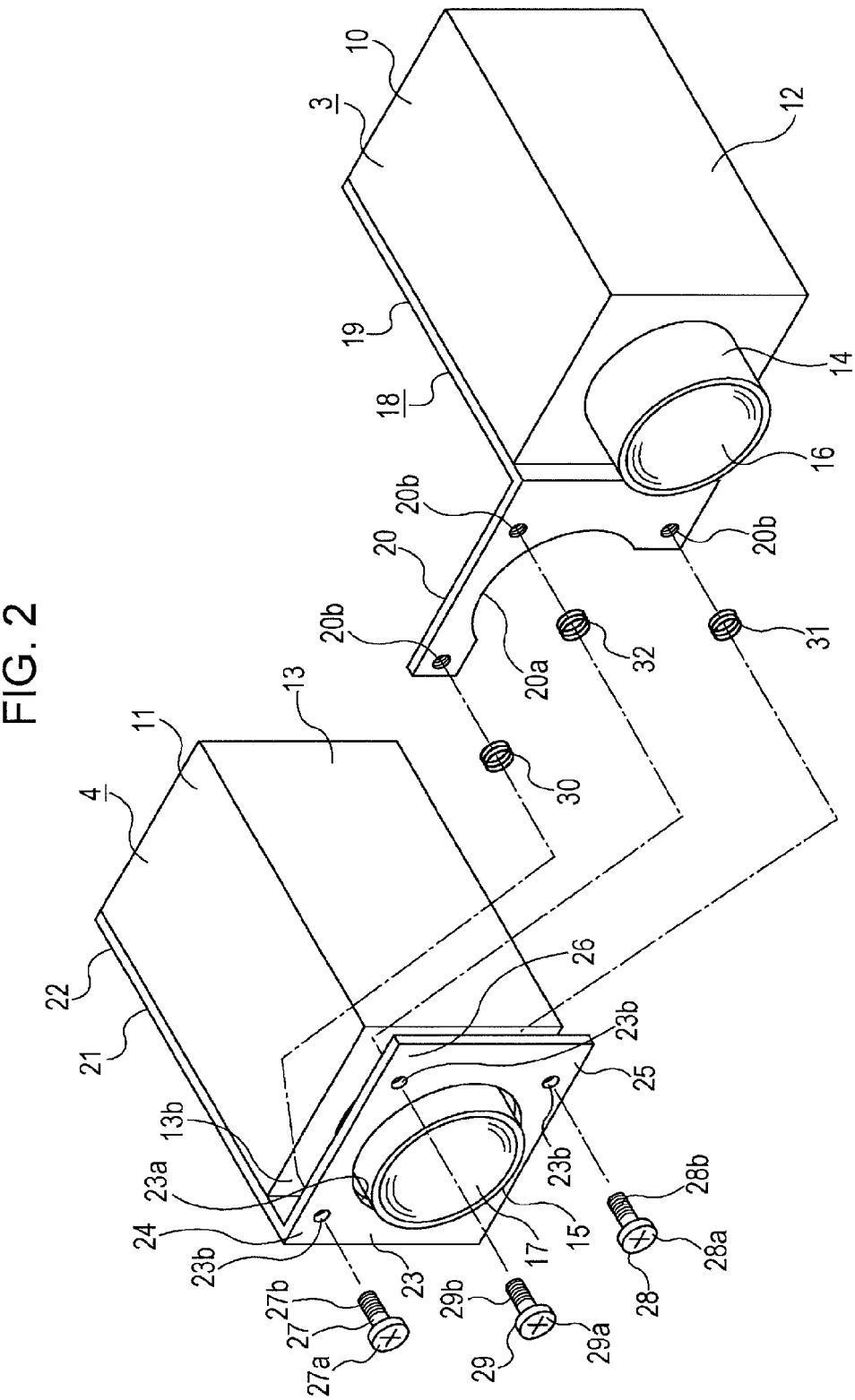
FIG. 2 is a perspective view in which a first lens barrel and a second lens barrel are illustrated as separated from each other.
Figure 3:
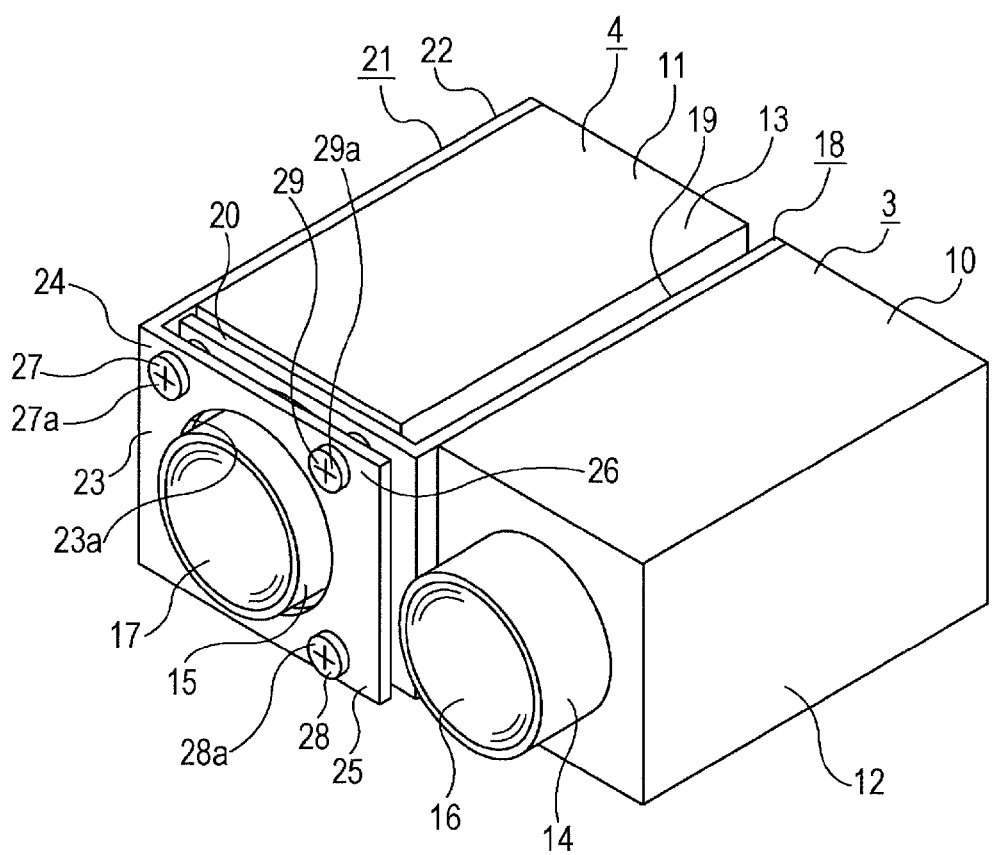
FIG. 3 is a perspective view illustrating a state where the first lens barrel and the second lens barrel are combined by a reference metal sheet and an adjustment metal sheet.
Figure 4:
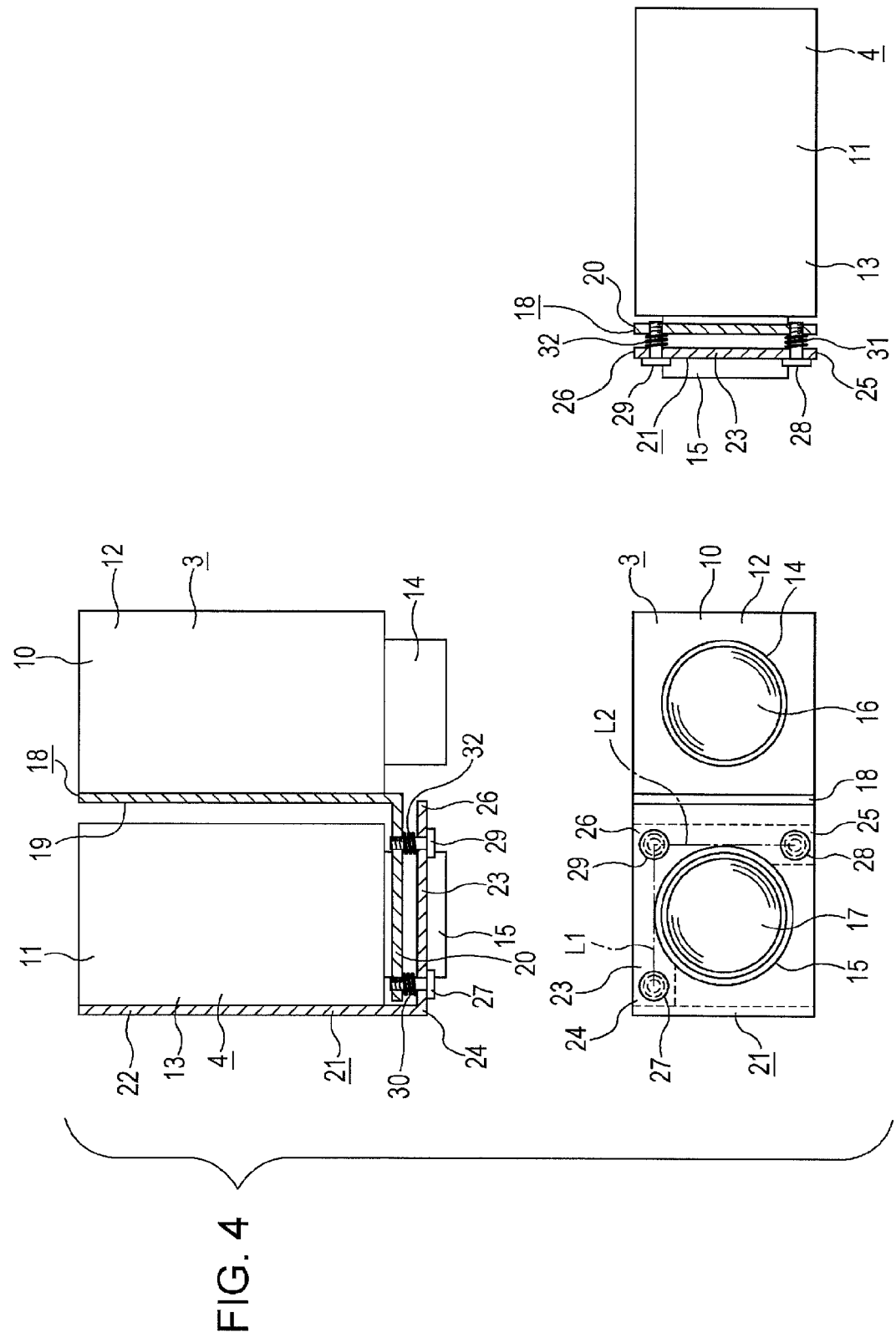
FIG. 4 is a view illustrating a portion of the first lens barrel and the second lens barrel, or the like, in cross-section when viewed from above, the front, and the side.

As illustrated in FIGS. 2 to 4, the first lens barrel 3 and the second lens barrel 4 each includes an optical system, and the optical system includes barrel portions 10 and 11 which are formed as a rectangular box-shape opened to the rear side, and a plurality of lens which is disposed side by side in the front and rear direction (optical axis direction) in the inner portion of the barrel portions 10 and 11, or the like.

The barrel portions 10 and 11 each includes rectangular box-shaped main body portions 12 and 13 which are opened to the rear side, and lens holding portions 14 and 15 which are protruded from the front surfaces of the main body portions 12 and 13 to the front side. The lens holding portions 14 and 15 are formed in a cylindrical shape, and lenses 16 and 17 which constitute a portion of each optical system are held to the lens holding portions 14 and 15.

A sheet metal for reference 18 is mounted on one side surface 12a of the main body portion 12 in the barrel portion 10 of the first lens barrel portion 3, for example, on the right side surface thereof. The sheet metal for reference 18 includes a mounted surface portion 19 which faces the left and right direction and a reference surface portion 20 which is protruded from the front end of the mounted surface portion 19 to the right side.

The mounted surface portion 19 is formed in a rectangular shape, and length in the front and rear direction of the mounted surface portion 19 is greater than that in the front and rear direction of the side surface 12a. In addition, the mounted surface portion 19 is mounted on the side surface 12a in a state where the front end of the mounted surface portion is protruded from the main body portion 12 to the front side.

For example, the reference surface portion 20 is formed in an L-shape, and a portion of the inner periphery thereof is formed as an arcuate notch 20a. Connecting screw holes 20b, 20b, and 20b each are formed in three corners in the up, the down, the left, and the right of the reference surface portion 20.

A sheet metal for adjustment 21 is mounted on one side surface 13a of the main body portion 13 in the barrel portion 11 of the second lens barrel portion 4, for example, on right side surface thereof. The sheet metal for adjustment 21 includes abase surface portion 22 which faces the left and right direction and an adjustment surface portion 23 which is protruded from the front end of the base surface portion 22 to the left side.

The base surface portion 22 is formed in a rectangular shape, and length in the front and rear direction of the base surface portion 22 is greater than that in the front and rear direction of the side surface 13a. In addition, the front end is mounted on the side surface 13a in a state where the front end of the base surface portion is protruded from the main body portion 13 to the front side.

The adjustment surface portion 23 is formed in a rectangular shape and includes a through-hole 23a which is penetrated in the front and rear side. For example, screw through-holes 23b, 23b, and 23b each are formed in three corners excluding the lower right corner of the adjustment surface portion 23. The corner of the right side of the adjustment surface portion 23 is installed as a first connecting portion 24, the corner of the lower left of the adjustment surface portion 23 is installed as a second connection portion 25, and the corner of the upper left of the adjustment surface portion 23 is installed as a third connection portion 26.

A line, which connects the center of the screw through-hole 23b formed in the first connection portion 24, that is, the center of a screw member described hereinafter which inserts and penetrates the screw through-hole 23b, and the center of the screw through-hole 23b formed in the third connection portion 26, that is, the center of a screw member described hereinafter which inserts and penetrates the screw through-hole 23b, is formed as a first line L1. A line, which connects the center of the screw through-hole 23b formed in the second connection portion 25, that is, the center of a screw member described hereinafter which inserts and penetrates the screw through-hole 23b, and the center of the screw through-hole 23b formed in the third connection portion 26, that is, the center of a screw member described hereinafter which inserts and penetrates the screw through-hole 23b, is formed as a second line L2. The first line L1 is extended in the left and right direction, the second line L2 is extended in the up and down direction, and the first line L1 and the second line L2 are perpendicular to each other. For example, the length of the first line L1 is the same as that of the second line L2.

The adjustment surface portion 23 is positioned in a state of being separated from the front surface 13b in the front of the front surface 13b of the main body portion 13. The lens holding portion 15 of the barrel portion 11 is inserted to the through-hole 23a of the adjustment surface portion 23.

The reference surface portion 20 of the reference metal sheet 18 is inserted between the front surface 13b of the main body portion 13 of the second lens barrel 4 and the adjustment surface portion 23 of the adjustment metal sheet 21.

In the state where the reference surface portion 20 is inserted between the front surface 13b of the main body portion 13 and the adjustment surface portion 23 of the adjustment metal sheet 21, the lens holding portion 15 of the barrel portion 11 is positioned in the inner side of the notch 20a of the reference surface portion 20. In addition, in the state where the reference surface portion 20 is inserted between the front surface 13b and the adjustment surface portion 23, the connecting screw holes 20b, 20b, and 20b formed in the reference surface portion 20 are each positioned just behind the screw through-holes 23b, 23b, and 23b formed in the adjustment surface portion 23.

The adjustment surface portion 23 is connected to the reference surface portion 20 by screw members 27, 28, and 29.

The screw members 27, 28, and 29 each include head portions 27a, 28a, and 29a and screw shaft portions 27b, 28b, and 29b.

The screw shaft portions 27b, 28b, and 29b of the screw members 27, 28, and 29 each are inserted and penetrated to the screw thorough-holes 23b, 23b, and 23b of the adjustment surface portion 23 and screwed to the connecting screw holes 20b, 20b, and 20b of the reference surface portion 20. Therefore, the adjustment surface portion 23 is connected to the reference surface portion 20.

When the screw shaft portions 27b, 28b, and 29b of the screw members 27, 28, and 29 each are screwed to the connecting screw holes 20b, 20b, and 20b, the screw shaft portions 27b, 28b, and 29b each are inserted and penetrated to spring members 30, 31, and 32, and the spring members 30, 31, and 32 each are disposed between the reference surface portion 20 and the adjustment surface portion 23. For example, a compression coil spring is used as the spring members 30, 31, and 32, and the spring members 30, 31, and 32 each are disposed in a state where the spring members are compressed between the reference surface portion 20 and the adjustment surface portion 23.

Accordingly, the adjustment surface portion 23 is biased to the front side by biasing forces of the spring members 30, 31, and 32 with respect to the reference surface portion 20.

The above-described screw members 27, 28, and 29 and spring members 30, 31, and 32 are installed as an adjustment section for adjusting an optical axis which is described after the explanation of the second lens barrel 4. However, the spring members 30, 31, and 32 are not limited to the compression coil spring, and may be any elastic member which biases the adjustment surface 23 to the reference surface portion 20. That is, for example, other elastic members such as a plate spring or a rubber as can be used as the spring member.

Optical Axis Adjustment of Second Lens Barrel

Hereinafter, an optical axis adjustment of the second lens barrel 4 in the imaging apparatus 1 will be described (refer to FIGS. 5 to 8).

In the imaging apparatus 1, a direction of the optical axis of the first lens barrel 3 is determined in advance and fixed to the inner portion of the case body 8. However, in order to parallelize the optical axis of the second lens barrel 4 with respect to the optical axis of the first lens barrel 3, the following optical axis adjustment is performed. In addition, the optical axis adjustment is performed in an adjusting process before a product (imaging apparatus 1) is marketed, and the second lens barrel 4 also is fixed to the inner portion of the case body 8 when the optical axis adjustment is completed.

First, the optical axis adjustment in a first direction (yawing direction) will be described (refer to FIGS. 5 and 6).

The optical axis adjustment in the first direction is performed by rotating the screw member 27, which is inserted and penetrated to the screw through-hole 23b of the first connection portion 24 of the adjustment surface portion 23 and screwed to the connecting screw hole 20b, through an adjusting tool (not illustrated) such as a screwdriver.

Figure 5:
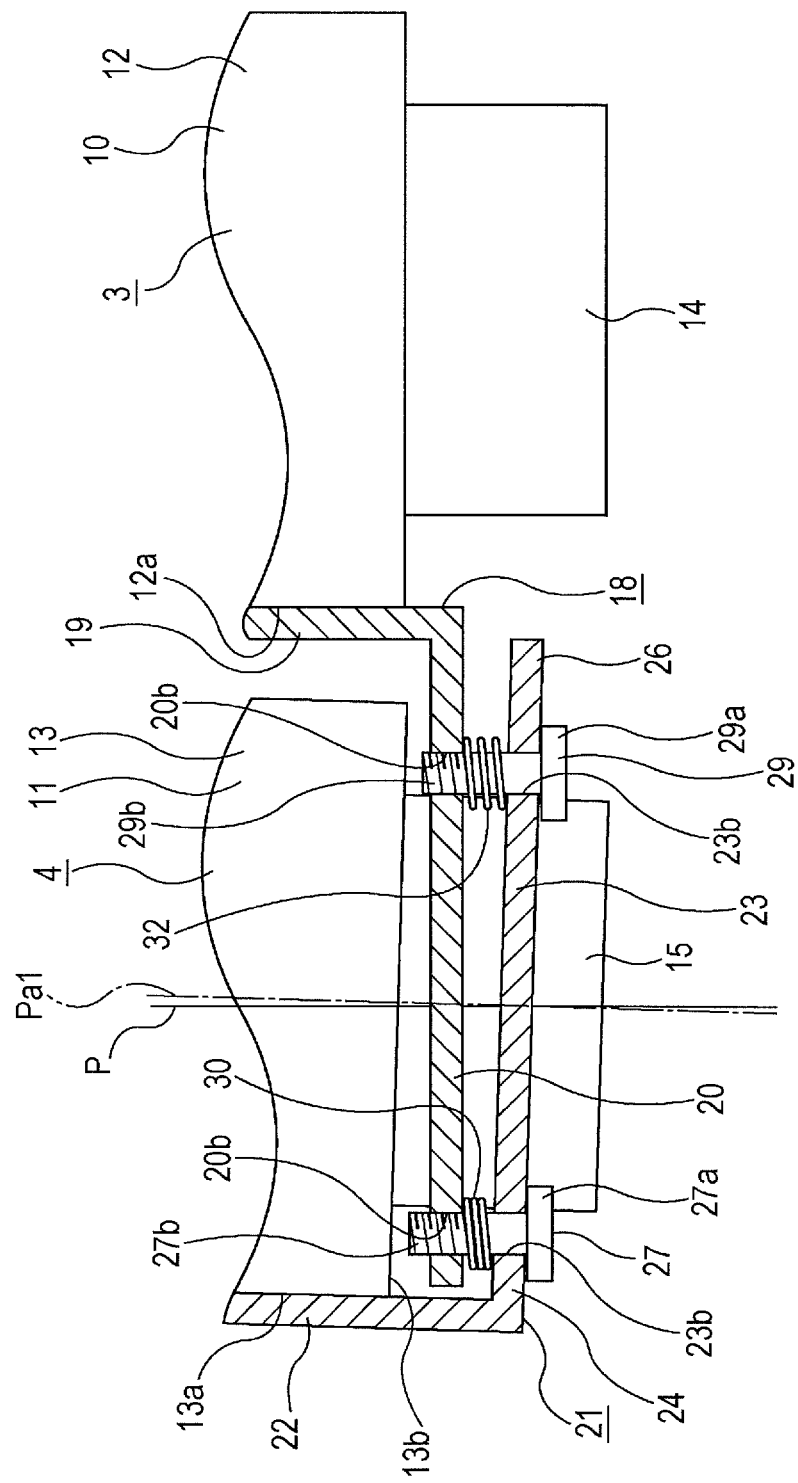
FIG. 5 is a partially cross-sectional and enlarged plan view illustrating a state where the optical axis adjustment is performed in a first direction.

For example, if the screw member 27 is rotated in one direction and tightened with respect to the connecting screw hole 20b, as illustrated in FIG. 5, the first connection portion 24 approaches the reference surface portion 20 against the biasing force of the spring member 31 and the distance between the first connection portion 24 and the reference surface portion 20 becomes small. When the distance between the first connection portion 24 and the reference surface portion 20 is small, since the distance between the second connection portion 25 and the third connection portion 26 and the reference surface portion 20 is not changed, the adjustment metal sheet 21 and the second lens barrel 4 are integrated and inclined in the first direction on the basis of the second line L2.

Accordingly, an optical axis P before the adjustment of the second lens barrel 4 becomes an optical axis Pa1 after the adjustment.

Figure 6:
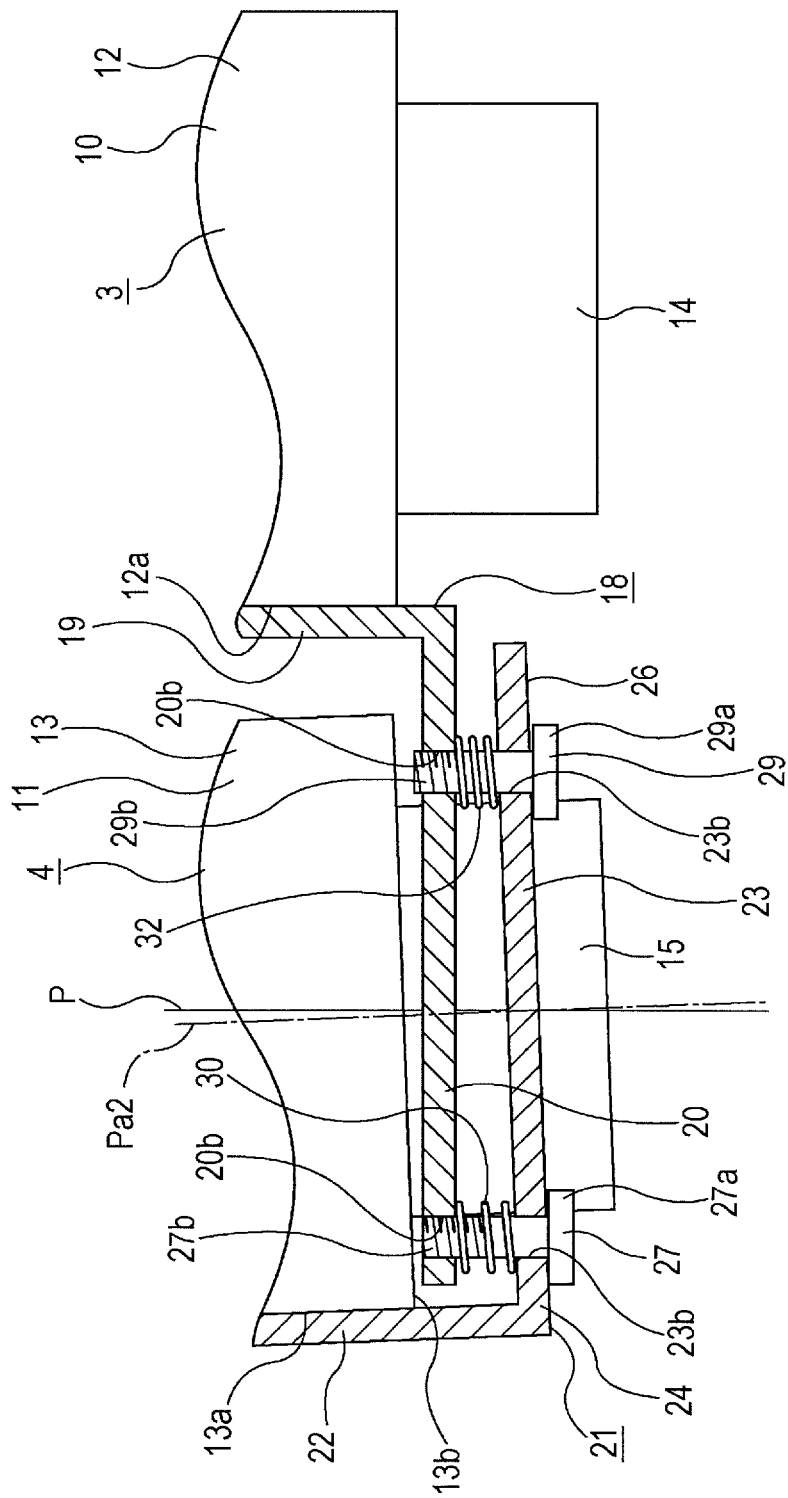
FIG. 6 is a partially cross-sectional and enlarged plan view illustrating a state where the optical axis adjustment in the first direction is performed at the direction other than that of FIG. 5.

On the contrary, if the screw member 27 is rotated in the other direction and loosened with respect to the connecting screw hole 20b, as illustrated in FIG. 6, the first connecting portion 24 is separated from the reference surface portion 20 by the biasing force of the spring member 31 and the distance between the first connection portion 24 and the reference surface portion 20 is great. When the distance between the first connecting portion 24 and the reference surface portion 20 is great, since the distance between the second connecting portion 25 and the third connecting portion 26 and the reference surface portion 20 is not changed, the adjustment metal sheet 21 and the second lens barrel 4 are integrated and inclined in the first direction on the basis of the second line L2.

Accordingly, the optical axis P before the adjustment of the second lens barrel 4 becomes an optical axis Pa2 after the adjustment.

Next, the optical axis adjustment in second direction (pitching direction) will be described (refer to FIGS. 7 and 8).

The optical axis adjustment in the second direction is performed by rotating the screw member 28, which is inserted and penetrated to the screw through-hole 23b of the second connection portion 25 of the adjustment surface portion 23 and screwed to the connecting screw hole 20b, through an adjusting tool such as a screwdriver.

Figure 7:
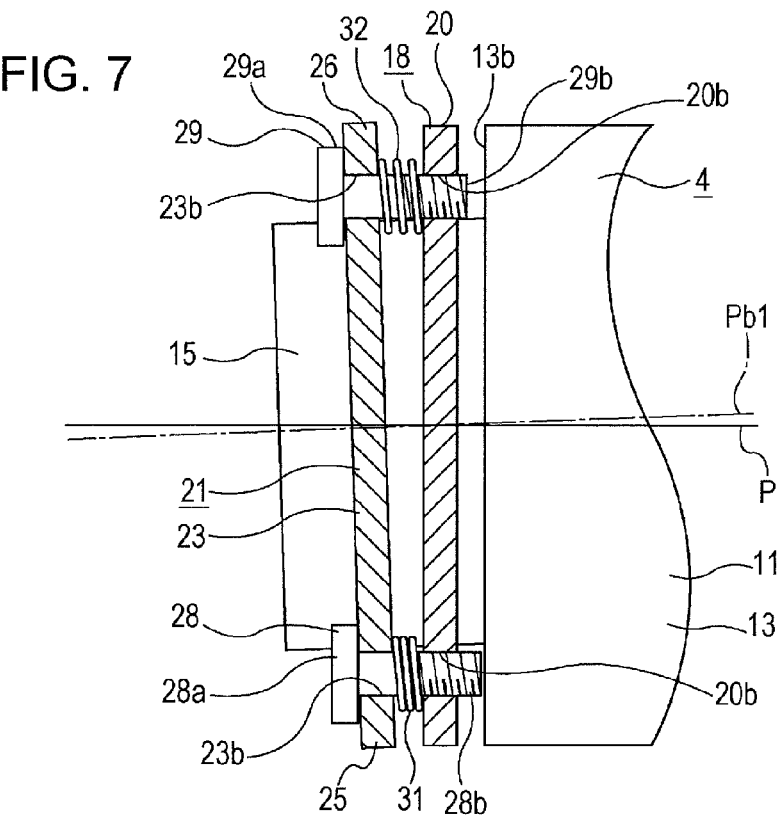
FIG. 7 is a partially cross-sectional and enlarged plan view illustrating a state where the optical axis adjustment is performed in a second direction.

For example, if the screw member 28 is rotated in one direction and tightened with respect to the connecting screw hole 20b, as illustrated in FIG. 7, the second connection portion 25 approaches the reference surface portion 20 against the biasing force of the spring member 31 and the distance between the second connection portion 25 and the reference surface portion 20 becomes small. When the distance between the second connection portion 25 and the reference surface portion 20 is small, since the distance between the first connection portion 24 and the third connection portion 26 and the reference surface portion 20 is not changed, the adjustment metal sheet 21 and the second lens barrel 4 are integrated and inclined in the second direction on the basis of the first line L1.

Accordingly, the optical axis P before the adjustment of the second lens barrel 4 becomes an optical axis Pb1 after the adjustment.

Figure 8:
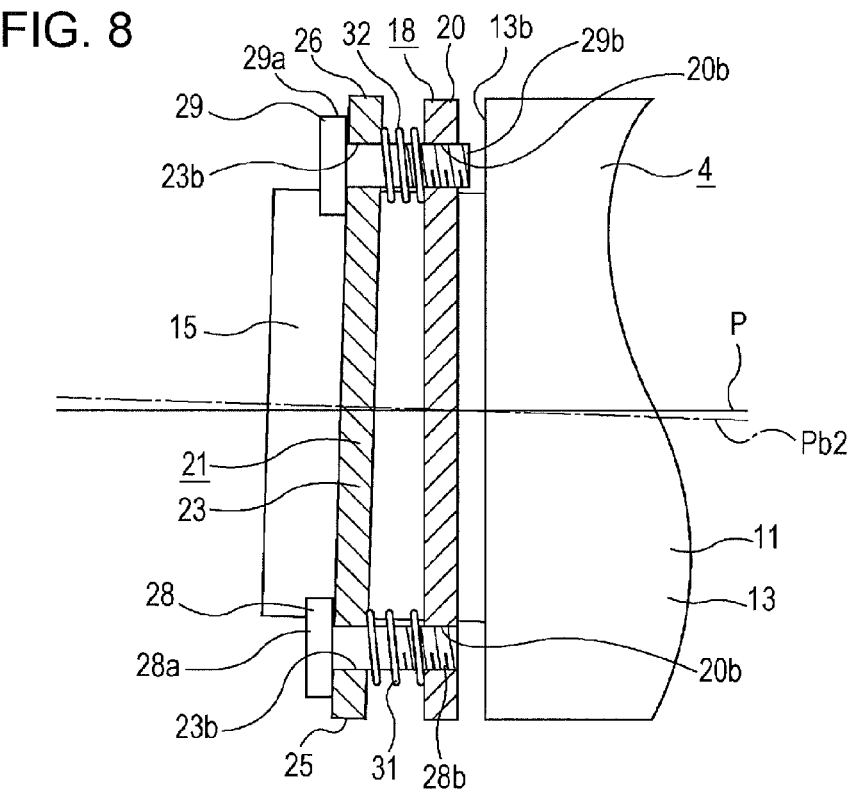
FIG. 8 is a partially cross-sectional and enlarged plan view illustrating a state where the optical axis adjustment in the second direction is performed at the direction other than that of FIG. 7.

On the contrary, if the screw member 28 is rotated in the other direction and loosened with respect to the connecting screw hole 20b, as illustrated in FIG. 8, the second connecting portion 25 is separated from the reference surface portion 20 by the biasing force of the spring member 31 and the distance between the second connecting portion 25 and the reference surface portion 20 is great. When the distance between the second connecting portion 25 and the reference surface portion 20 is large, since the distance between the first connecting portion 24 and the third connecting portion 26 and the reference surface portion 20 is not changed, the adjustment metal sheet 21 and the second lens barrel 4 are integrated and inclined in the second direction on the basis of the first line L1.

Accordingly, the optical axis P before the adjustment of the second lens barrel 4 becomes an optical axis Pb2 after the adjustment.

In this way, due to the optical axis adjustments in the first direction and the second direction being performed, the optical axis P of the second lens barrel 4 can be parallel to the optical axis of the first lens barrel 3.

In addition, in the imaging apparatus 1, since the spring member 32 is disposed between the third connecting portion 26 of the adjustment surface portion 23 and the reference surface portion 20, the screw member 29, which is inserted and penetrated to the screw through-hole 23b of the third connecting portion 26 and screwed to the connecting screw hole 20b, can be rotated by an adjustment tool such as a screwdriver. Accordingly, the position of the second lens barrel 4 in the optical axis direction can be also adjusted by rotating the screw members 27, 28, and 29.

In the imaging apparatus 1 described above, since the third connecting portion 26 is installed in the adjustment surface portion 23 and the spring member 32 is disposed between the third connecting portion 26 and the reference surface portion 20, the position adjustment of the second lens barrel 4 in the optical axis direction can be performed, and position accuracy between the first lens barrel 3 and the second lens barrel 4 can be improved.

Figure 9:
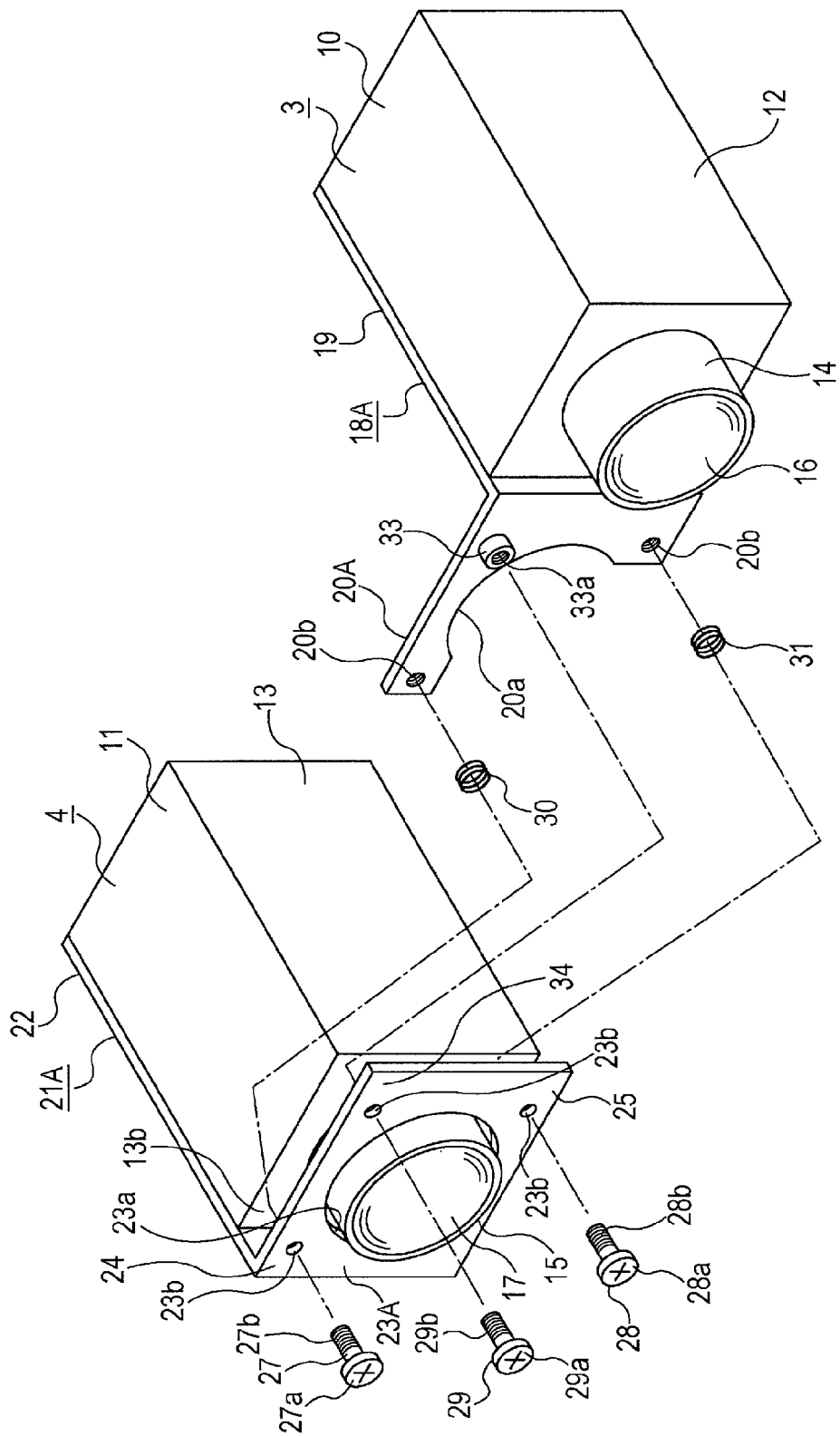
FIG. 9 illustrates a modification of the first embodiment along with FIGS. 10 to 15 and is a perspective view in which the first lens barrel and the second lens barrel are separated from each other and illustrated.
Figure 10:
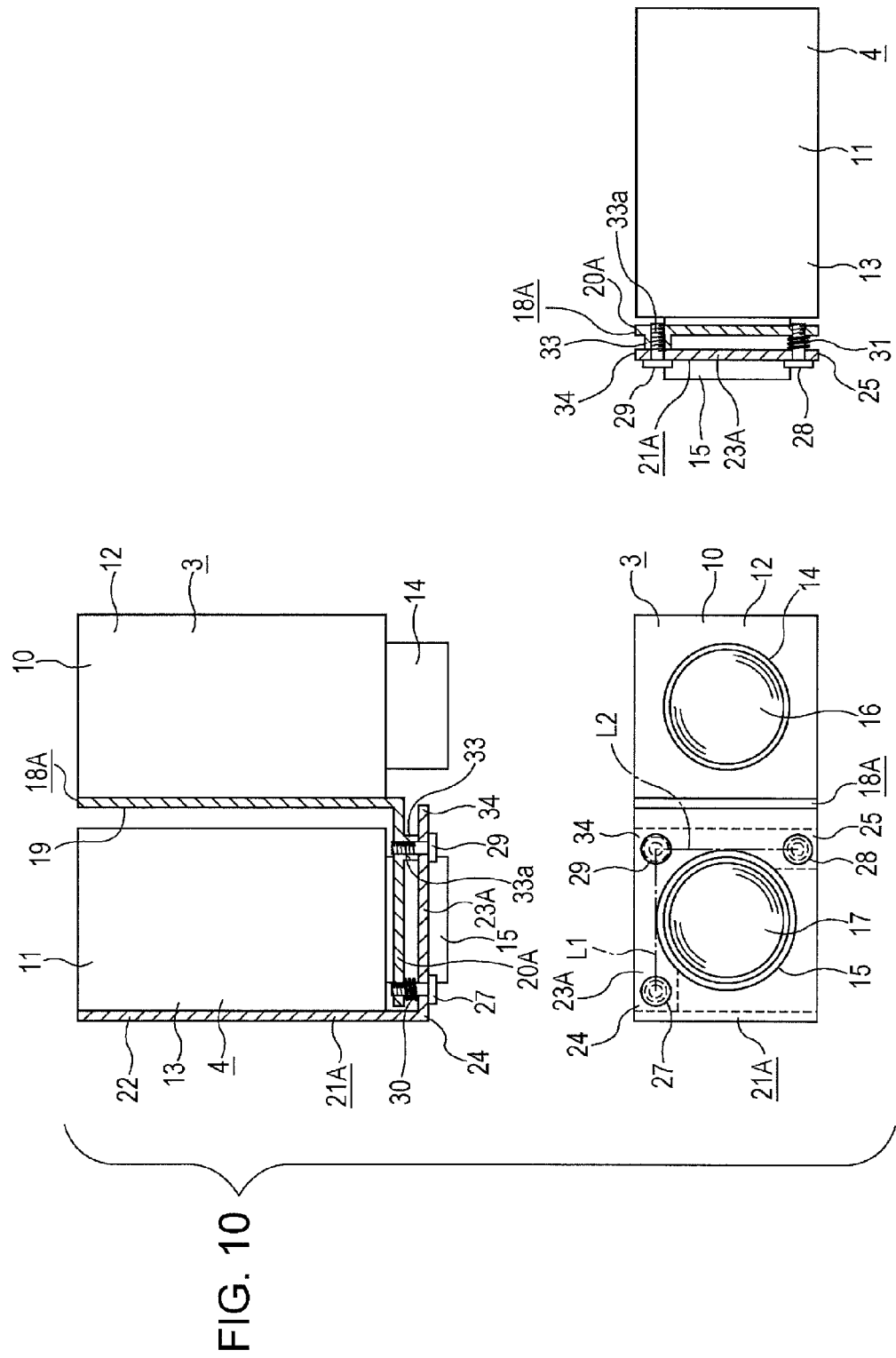
FIG. 10 is a view in which a portion of the first lens barrel and the second lens barrel or the like is cross-section and which views from above, the front, and the side.

Configuration of Imaging Apparatus According to Modification of First Embodiment Hereinafter, configuration of a modification of the imaging apparatus will be described (refer to FIGS. 9 and 10).

In addition, only difference between the imaging apparatus according to the modification described below and the above-described imaging apparatus 1 is that the third connecting of the adjustment surface portion is installed as a fixing portion in the imaging apparatus of the modification. Therefore, only parts other than the imaging apparatus 1 are described in detail, and other parts are denoted by the same reference numbers as those of the imaging apparatus 1 and the descriptions thereof are omitted.

A sheet metal for reference 18A is mounted on one side surface 12a of the main body portion 12 in the barrel portion 10 of the first lens barrel portion 3, for example, on the right side surface thereof. The sheet metal for reference 18A includes the mounted surface portion 19 which faces the left and right direction and a reference surface portion 20A which is protruded from the front end of the mounted surface portion 19 to the right side.

For example, the reference surface portion 20A is formed in an L-shape, and a portion of the inner periphery thereof is formed as an arcuate notch 20a. The connecting screw holes 20b and 20b each are formed in two corners in the upper right and the lower left of the reference surface portion 20A. A fixing cylindrical boss 33 which is protruded to the front side is installed in the corner in the upper left of the reference surface portion 20A. A fixing screw hole 33a which is penetrated in the front and rear side is formed in the inner peripheral surface of the fixing boss 33.

A sheet metal for adjustment 21A is mounted on one side surface 13a of the main body portion 13 in the barrel portion 11 of the second lens barrel portion 4, for example, on right side surface thereof. The sheet metal for adjustment 21A includes a base surface portion 22 which faces the left and right direction and an adjustment surface portion 23A which is protruded from the front end of the base surface portion 22 to the left side.

The adjustment surface portion 23A is formed in a rectangular shape and includes a through-hole 23a which is penetrated to the front and rear side. For example, screw through-holes 23b, 23b, and 23b each are formed in three corners excluding the lower right corner of the adjustment surface portion 23A. The corner of the right side of the adjustment surface portion 23A is installed as a first connecting portion 24, the corner of the lower side of the adjustment surface portion 23A is installed as a second connection portion 25, and the corner of the upper left side of the adjustment surface portion 23A is installed as a fixing portion 34.

A line, which connects the center of the screw through-hole 23b formed in the first connection portion 24, that is, the center of a screw member 27 which inserts and penetrates the screw through-hole 23b, and the center of the screw through-hole 23b formed in the fixing portion 34, that is, the center of a screw member 29 which inserts and penetrates the screw through-hole 23b, is formed as a first line L1. A line, which connects the center of the screw through-hole 23b formed in the second connection portion 25, that is, the center of a screw member 28 which inserts and penetrates the screw through-hole 23b, and the center of the screw through-hole 23b formed in the fixing portion 34, that is, the center of a screw member 29 which inserts and penetrates the screw through-hole 23b, is formed as a second line L2. The first line L1 is extended in the left and right direction, the second line L2 is extended in the up and down direction, and the first line L1 and the second line L2 are perpendicular to each other. For example, the length of the first line L1 is the same as that of the second line L2.

The adjustment surface portion 23A is positioned in a state of being separated from the front surface 13b in the front of the front surface 13b of the main body portion 13. The lens holding portion 15 of the barrel portion 11 is inserted to the through-hole 23a of the adjustment surface portion 23A.

The reference surface portion 20A of the reference metal sheet 18A is inserted between the front surface 13b of the main body portion 13 of the second lens barrel 4 and the adjustment surface portion 23A of the adjustment metal sheet 21A.

In the state where the reference surface portion 20A is inserted between the front surface 13b of the main body portion 13 and the adjustment surface portion 23A of the adjustment metal sheet 21A, the lens holding portion 15 of the barrel portion 11 is positioned in the inner side of the notch 20a of the reference surface portion 20A. Moreover, in the state where the reference surface portion 20A is inserted between the front surface 13b and the adjustment surface portion 23A, the connecting screw holes 20b, and 20b and the fixing hole 33a each formed in the reference surface portion 20A are positioned just behind the screw through-holes 23b, 23b, and 23b formed in the adjustment surface portion 23A.

The adjustment surface portion 23A is connected to the reference surface portion 20A by screw members 27, 28, and 29.

The screw shaft portions 27b, 28b, and 29b of the screw members 27, 28, and 29 each are inserted and penetrated to the screw thorough-holes 23b, 23b, and 23b of the adjustment surface portion 23A and screwed to the connecting screw holes 20b and 20b and the fixing hole 33a of the reference surface portion 20A. Therefore, the adjustment surface portion 23A is connected to the reference surface portion 20A. At this time, the rear surface of the adjustment surface portion 23A strikes the front surface of the fixing boss 33 installed on the reference surface portion 20A, and the fixing portion 34 is fixed to the reference surface portion 20A.

When the screw shaft portions 27b, 28b, and 29b of the screw members 27, 28, and 29 each are screwed to the connecting screw holes 20b and 20b, the screw shaft portions 27b and 28b each are inserted and penetrated to spring members 30 and 31, and the spring members 30 and 31 each are positioned between the reference surface portion 20A and the adjustment surface portion 23A. For example, a compression coil spring is used as the spring members 30 and 31, and the spring members 30 and 31 each are disposed in a state where the spring members are compressed between the reference surface portion 20A and the adjustment surface portion 23A.

Accordingly, the adjustment surface portion 23A is biased to the front side by biasing forces of the spring members 30 and 31 with respect to the reference surface portion 20A.

Optical Axis Adjustment of Second Lens Barrel in Imaging Apparatus according to Modification Hereinafter, an optical axis adjustment of the second lens barrel 4 in the imaging apparatus according to the modification will be described (refer to FIGS. 11 to 14).

First, the optical axis adjustment in a first direction (yawing direction) will be described (refer to FIGS. 11 and 12).

The optical axis adjustment in the first direction is performed by rotating the screw member 27, which is inserted and penetrated to the screw through-hole 23b of the first connection portion 24 of the adjustment surface portion 23A and screwed to the connecting screw hole 20b, through an adjusting tool (not illustrated) such as a screwdriver.

Figure 11:
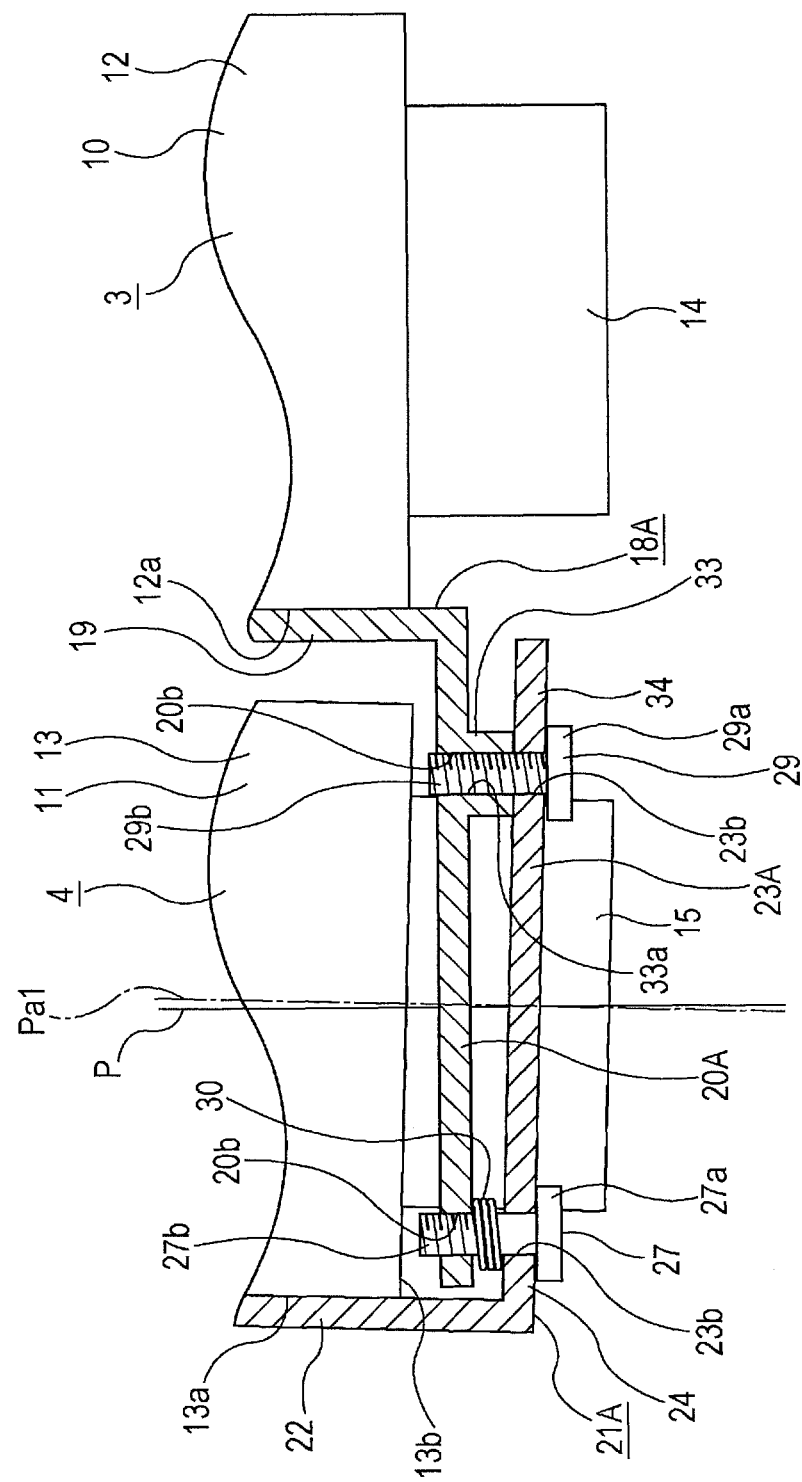
FIG. 11 is a partially cross-sectional and enlarged plan view illustrating a state where the optical axis adjustment is performed in a first direction.

For example, if the screw member 27 is rotated in one direction and tightened with respect to the connecting screw hole 20b, as illustrated in FIG. 11, the first connection portion 24 approaches the reference surface portion 20A against the biasing force of the spring member 31 and the distance between the first connection portion 24 and the reference surface portion 20A becomes small. When the distance between the first connection portion 24 and the reference surface portion 20A is small, since the distance between the second connection portion 25 and the fixing portion 34 and the reference surface portion 20A is not changed, the adjustment surface portion 23A is bent so as to have the fixing portion 34 as the supporting point, and the second barrel 4 is inclined in the first direction on the basis of the fixing portion 34.

Accordingly, the optical axis P before the adjustment of the second lens barrel 4 becomes the optical axis Pa1 after the adjustment.

Figure 12:
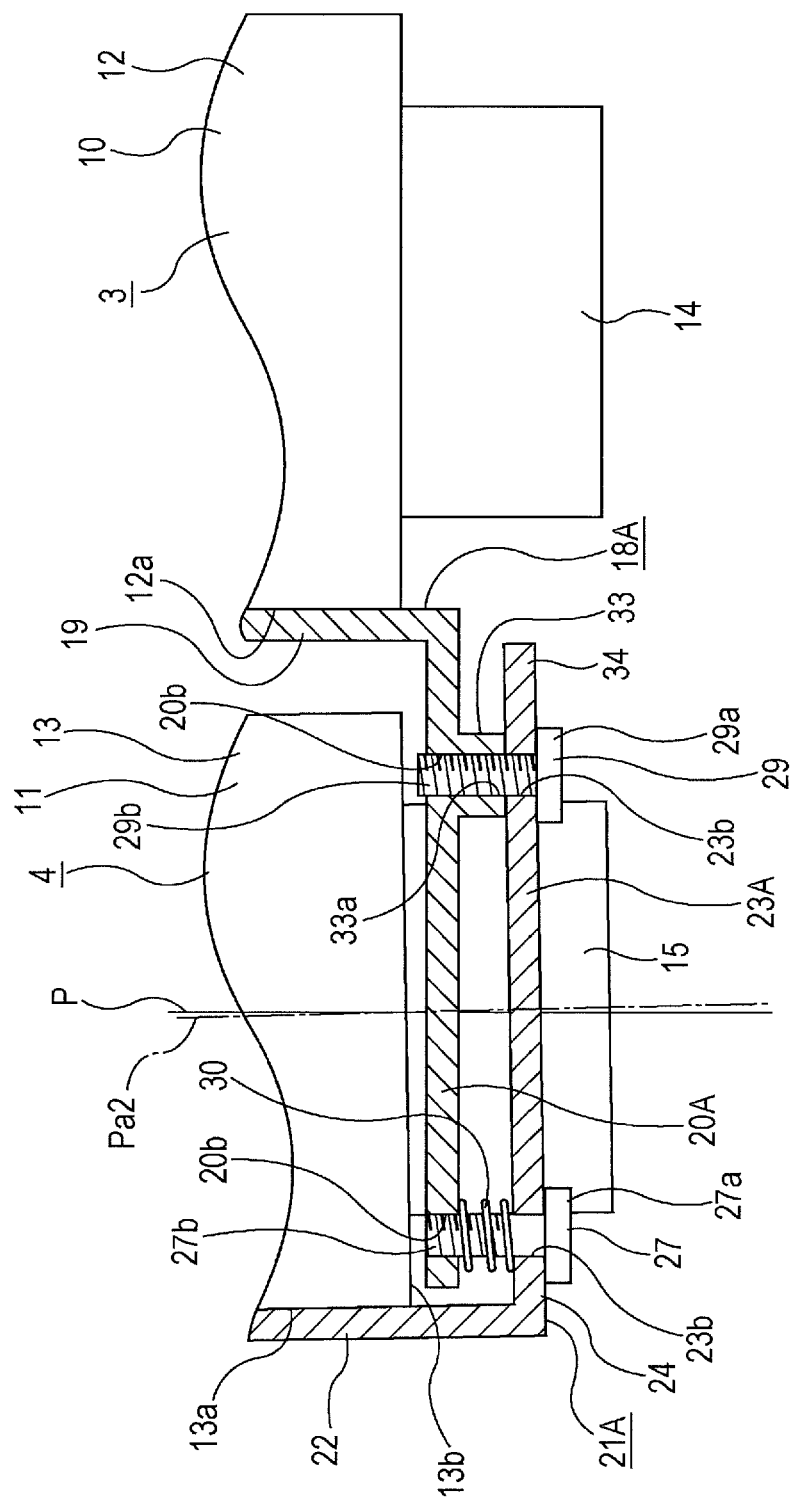
FIG. 12 is a partially cross-sectional and enlarged plan view illustrating a state where the optical axis adjustment in the first direction is performed at the direction other than that of FIG. 11.

On the contrary, if the screw member 27 is rotated in the other direction and loosened with respect to the connecting screw hole 20b, as illustrated in FIG. 12, the first connecting portion 24 is separated from the reference surface portion 20A by the biasing force of the spring member 31 and the distance between the first connecting portion 24 and the reference surface portion 20A is great. When the distance between the first connecting portion 24 and the reference surface portion 20A is great, since the distance between the second connecting portion 25 and the fixing portion 34 and the reference surface portion 20A is not changed, the adjustment surface portion 23A is bent so as to have the fixing portion 34 as the supporting point, and the second barrel 4 is inclined in the first direction on the basis of the fixing portion 34.

Accordingly, the optical axis P before the adjustment of the second lens barrel 4 becomes the optical axis Pa2 after the adjustment.

Next, the optical axis adjustment in the second direction (pitching direction) will be described (refer to FIGS. 13 and 14).

The optical axis adjustment in the second direction is performed by rotating the screw member 28, which is inserted and penetrated to the screw through-hole 23b of the second connection portion 25 of the adjustment surface portion 23A and screwed to the connecting screw hole 20b, through an adjusting tool such as a screwdriver.

Figure 13:
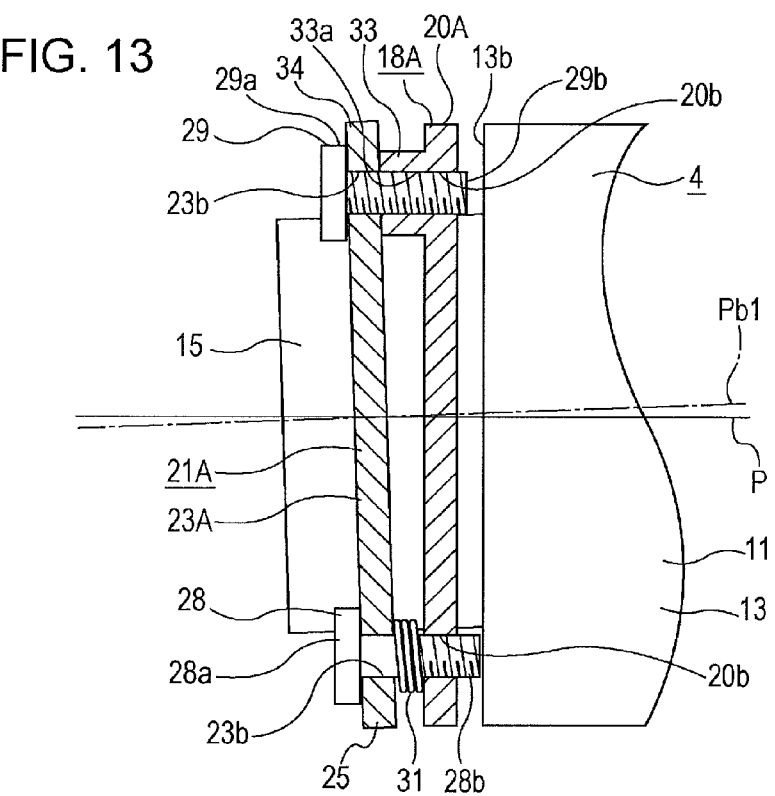
FIG. 13 is a partially cross-sectional and enlarged plan view illustrating a state where the optical axis adjustment is performed in a second direction.

For example, if the screw member 28 is rotated in one direction and tightened with respect to the connecting screw hole 20b, as illustrated in FIG. 13, the second connection portion 25 approaches the reference surface portion 20A against the biasing force of the spring member 31 and the distance between the second connection portion 25 and the reference surface portion 20A becomes small. When the distance between the second connection portion 25 and the reference surface portion 20A is small, since the distance between the first connection portion 24 and the fixing portion 34 and the reference surface portion 20A is not changed, the adjustment surface portion 23A is bent so as to have the fixing portion 34 as the supporting point, and the second barrel 4 is inclined in the first direction on the basis of the fixing portion 34.

Accordingly, the optical axis P before the adjustment of the second lens barrel 4 becomes the optical axis Pb1 after the adjustment.

Figure 14:
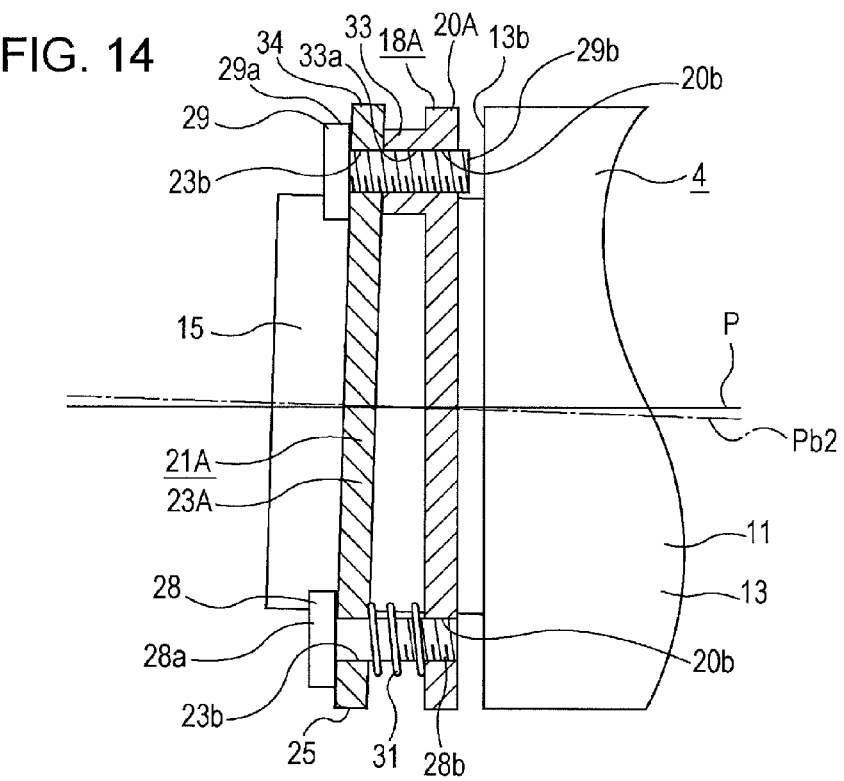
FIG. 14 is a partially cross-sectional and enlarged plan view illustrating a state where the optical axis adjustment in the second direction is performed at the direction other than that of FIG. 13.

On the contrary, if the screw member 28 is rotated in the other direction and loosened with respect to the connecting screw hole 20b, as illustrated in FIG. 14, the second connecting portion 25 is separated from the reference surface portion 20A by the biasing force of the spring member 31 and the distance between the second connecting portion 25 and the reference surface portion 20A is great. When the distance between the second connecting portion 25 and the reference surface portion 20A is great, since the distance between the first connecting portion 24 and the fixing portion 34 and the reference surface portion 20A is not changed, the adjustment surface portion 23A is bent so as to have the fixing portion 34 as the supporting point, and the second lens barrel 4 is inclined in the first direction on the basis of the fixing portion 34.

Accordingly, the optical axis P before the adjustment of the second lens barrel 4 becomes an optical axis Pb2 after the adjustment.

In this way, due to the optical axis adjustments in the first direction and the second direction being performed, the optical axis P of the second lens barrel 4 can be parallel to the optical axis of the first lens barrel 3.

In the imaging apparatus according to the modification, as described above, since the spring member is not disposed between the fixing portion 34 of the adjustment surface portion 23A and the reference surface portion 20A, the optical axis adjustment of the second lens barrel 4 can be performed while decreasing the number of parts.

Figure 15:
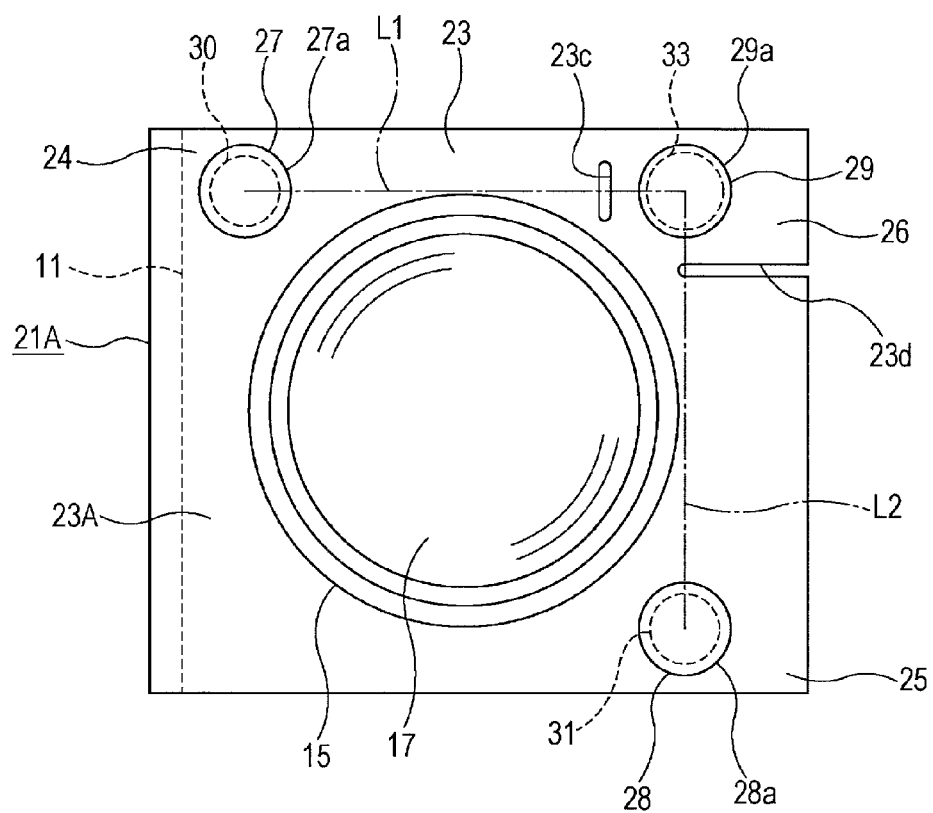
FIG. 15 an enlarged front view illustrating an example in which a slit and a notch are formed in the periphery of a fixing portion.

In addition, in the imaging apparatus according to the modification, as illustrated in FIG. 15, a slit 23c or a notch 23d may be formed in the periphery of fixing portion 34 of the adjustment surface portion 23A in the adjustment metal sheet 21A.

Due to the fact that the slit 23c or the notch 23d is formed in the periphery of the fixing portion 34, the adjustment surface portion 23A is easily bent so as to have the fixing portion 34 as the supporting point in the optical axis adjustment, and the optical axis adjustment can be easily performed.

Moreover, it is preferable that the slit 23c or the notch 23d formed on the periphery of the fixing portion 34 is formed on the first line L1 or the second line L2.

Since the bending direction of the adjustment surface portion 23A is the first direction or the second direction, due to the fact that the slit 23c or the notch 23d is formed on the first line L1 or the second Line L2, improved flexibility of the adjustment surface portion 23A can be secured, and the optical axis adjustment can be further easily performed.

Moreover, for example, in order to easily bend the adjustment surface portion 23A, instead of the silt 23c or the notch 23d, a groove which makes the thickness of a portion of the adjustment surface portion 23A to be thin may be formed in the periphery of the fixing portion 34.

Effect of Imaging Apparatus in First Embodiment

In the above-described first embodiment, a plurality of screw members 27, 28, and 29 and a plurality of spring members 30, 31, and 32 are provided as the adjustment section.

Accordingly, the optical axis adjustment of the second lens barrel 4 can be performed by simple configuration, and therefore, the optical axis adjustment of the second lens barrel 4 can be performed without increasing manufacturing costs.

In addition, since the spring members 30, 31, and 32 are disposed between the reference surface portion 20 and the adjustment surface portion 23, when impacts due to dropping of the imaging apparatus 1 or the like occur, the impact is absorbed by the spring members 30, 31, and 32, and the position displacement or deformation of each portion can be prevented.

Moreover, since the screw members 27, 28, and 29 each are inserted and penetrated to the spring members 30, 31, and 32, for example, even when an impact due to dropping or the like occurs, falling out of the spring members 30, 31, and 32 can be prevented.

Second Embodiment

Configuration of Imaging Apparatus

Figure 16:
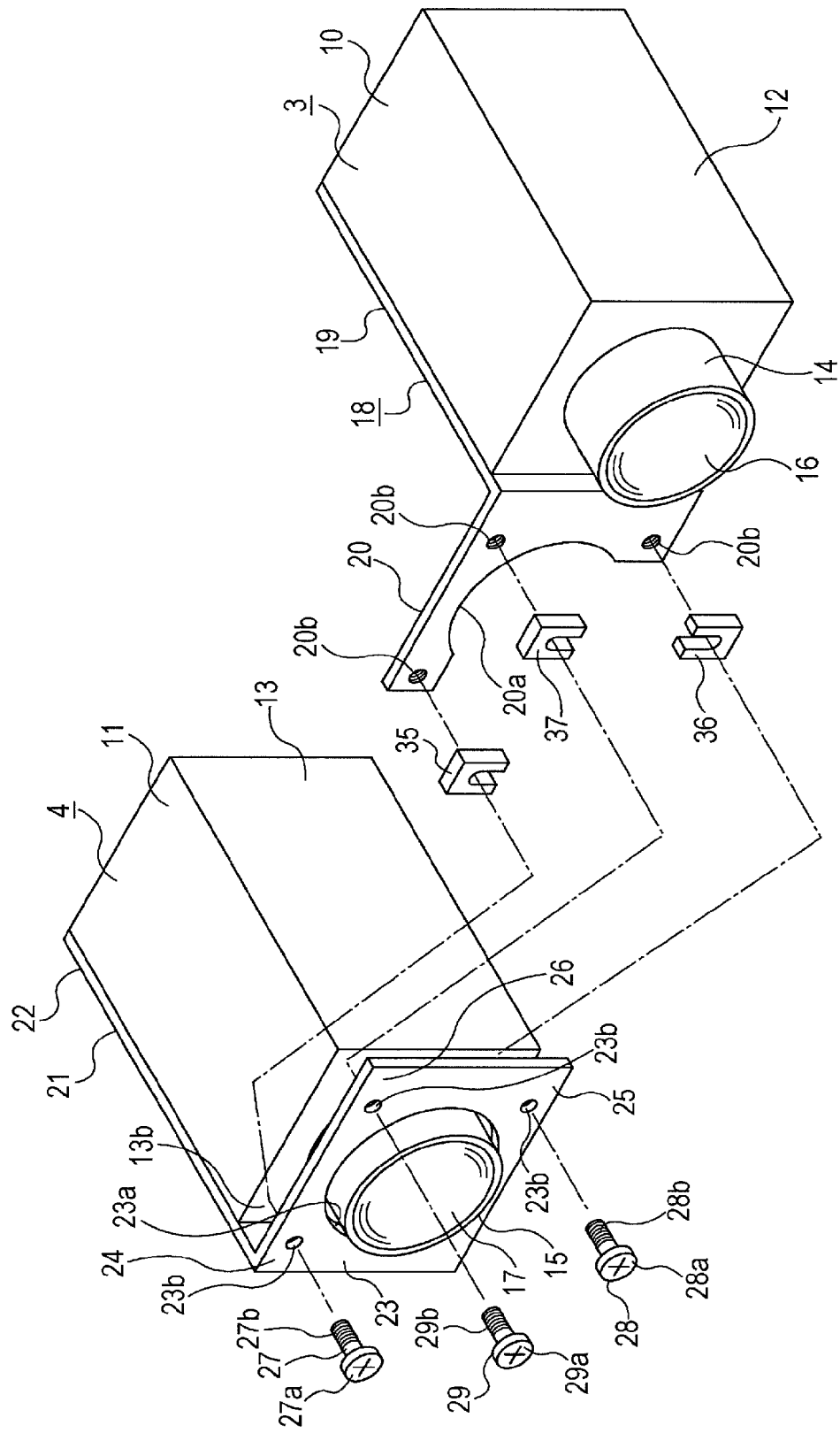
FIG. 16 illustrates a second embodiment along with FIGS. 17 and 18, and is a perspective view in which the first lens barrel and the second lens barrel are separated from each other and illustrated.
Figure 17:
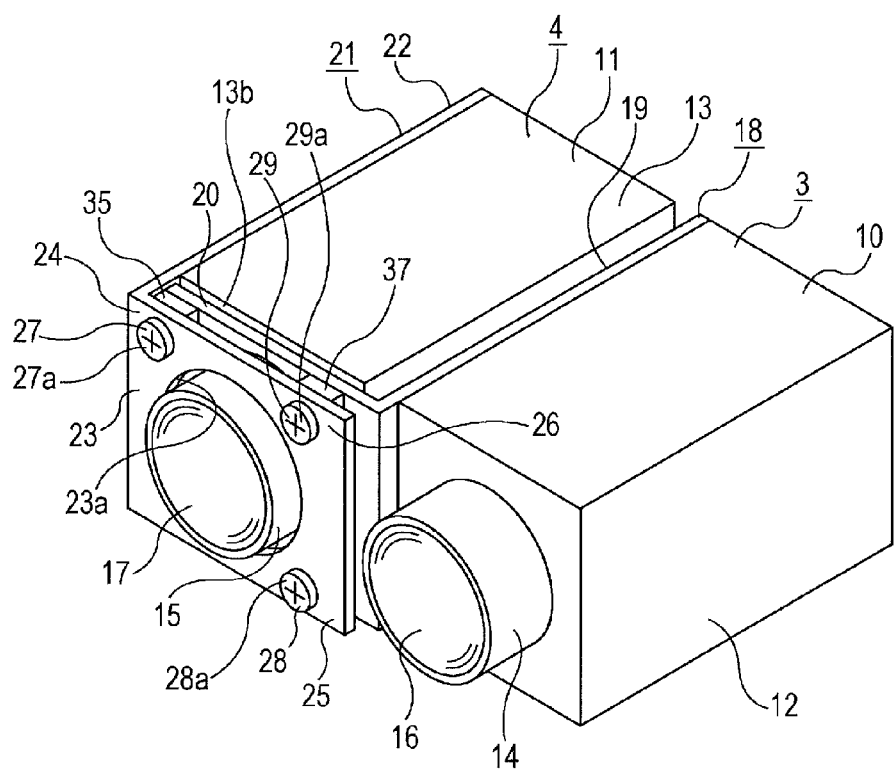
FIG. 17 is a perspective view illustrating a state where the first lens barrel and the second lens barrel are combined by the reference metal sheet and the adjustment metal sheet.
Figure 18:
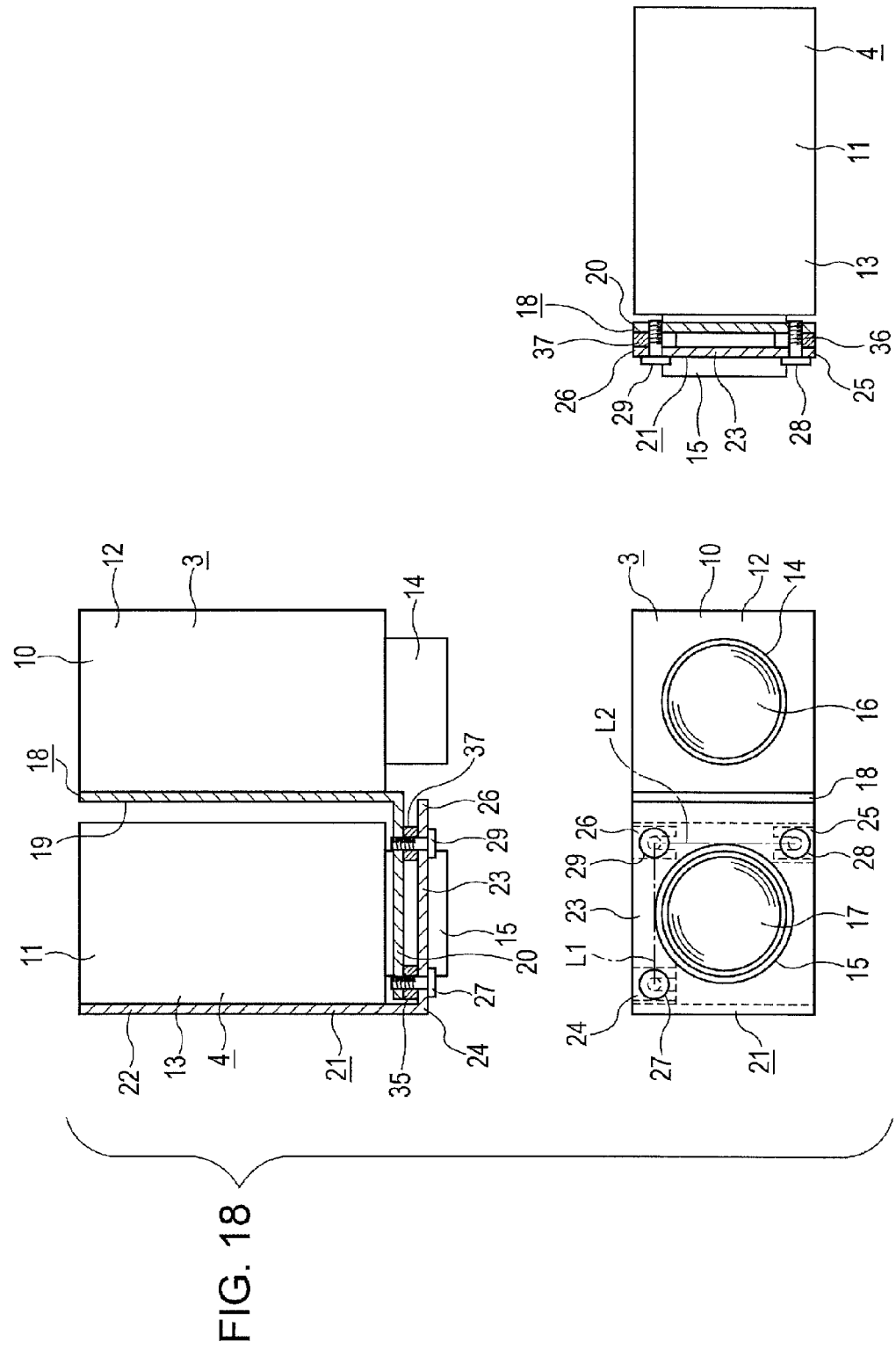
FIG. 18 is a view in which a portion of the first lens barrel and the second lens barrel or the like is cross-section and which views from above, the front, and the side.

Hereinafter, configuration of an imaging apparatus according to a second embodiment will be described (refer to FIGS. 16 to 18).

In addition, only difference between the imaging apparatus according to the second embodiment described below and the above-described imaging apparatus 1 is that the screw member and a spacer are used as the adjustment section performing the adjustment of the optical axis in the imaging apparatus of the second embodiment. Therefore, only parts other than the imaging apparatus 1 are described in detail, and other parts are denoted by the same reference numbers as those of the imaging apparatus 1 and the descriptions thereof are omitted.

In the imaging apparatus according to the second embodiment, screw members 27, 28, and 29 and spacers 35, 36, and 37 are used as the adjustment section which performs the adjustment of the optical axis. The spacers 35, 36, and 37 are formed by hard materials which are difficult to be elastically deformed, and for example, in approximately U-shape.

The spacers 35, 36, and 37 which each includes various thicknesses in the front and rear direction are prepared, and the spacer having the thickness according to the necessity is selected and used as the adjustment section.

The adjustment surface portion 23 is connected to the reference surface portion 20 by the screw members 27, 28 and 29.

When the screw shaft portions 27b, 28b, and 29b of the screw members 27, 28, and 29 each are screwed to the connecting screw holes 20b, 20b, and 20b, the screw shaft portions 27b, 28b, and 29b each are inserted and penetrated to spacers 35, 36, and 37, and the spacers 35, 36, and 37 each are positioned between the reference surface portion 20 and the adjustment surface portion 23.

Optical Axis Adjustment of Second Lens Barrel

Hereinafter, an optical axis adjustment of the second lens barrel 4 in the imaging apparatus according to the second embodiment will be described.

First, the optical axis adjustment in a first direction (yawing direction) will be described.

The optical axis adjustment in the first direction is performed by disposing the spacer 35 having a desired thickness between the first connecting portion 24 and the reference surface portion 20.

For example, if the spacer 35, which have a thickness which is thinner than the thickness of the spacer 37 which is disposed between the third connecting portion 26 and the reference surface portion 20 and the thickness of the spacer 36 which is disposed between the second connecting portion 25 and the reference surface portion 20, is disposed between the first connecting portion 24 and the reference surface portion 20, the distance between the first connecting portion 24 and the reference surface portion 20 is smaller than the distance between the third connecting portion 26 and the reference surface portion 20 and the distance between the second connecting portion 25 and the reference surface portion 20. When the distance between the first connecting portion 24 and the reference surface portion 20 is small, since the distance between the second connecting portion 25 and the third connecting portion 26 and the reference surface portion 20 is not changed, the adjustment surface portion 23 is bent so as to have the second line L2 as the supporting point and the second lens barrel 4 is inclined in the first direction on the basis of the second line L2.

On the contrary, if the spacer 35, which have a thickness which is thicker than the thickness of the spacer 37 which is disposed between the third connecting portion 26 and the reference surface portion 20 and the thickness of the spacer 36 which is disposed between the second connecting portion 25 and the reference surface portion 20, is disposed between the first connecting portion 24 and the reference surface portion 20, the distance between the first connecting portion 24 and the reference surface portion 20 is greater than the distance between the third connecting portion 26 and the reference surface portion 20 and the distance between the second connecting portion 25 and the reference surface portion 20. When the distance between the first connecting portion 24 and the reference surface portion 20 is great, since the distance between the second connecting portion 25 and the third connecting portion 26 and the reference surface portion 20 is not changed, the adjustment surface portion 23 is bent so as to have the second line L2 as the supporting point and the second lens barrel 4 is inclined in the first direction on the basis of the second line L2.

Next, the optical axis adjustment in the second direction (pitching direction) will be described.

The optical axis adjustment in the second direction is performed by disposing the spacer 36 having a desired thickness between the second connecting portion 25 and the reference surface portion 20.

For example, if the spacer 36, which have a thickness which is thinner than the thickness of the spacer 37 which is disposed between the third connecting portion 26 and the reference surface portion 20 and the thickness of the spacer 35 which is disposed between the first connecting portion 24 and the reference surface portion 20, is disposed between the second connecting portion 25 and the reference surface portion 20, the distance between the second connecting portion 25 and the reference surface portion 20 is smaller than the distance between the third connecting portion 26 and the reference surface portion 20 and the distance between the first connecting portion 24 and the reference surface portion 20. When the distance between the second connecting portion 25 and the reference surface portion 20 is small, since the distance between the first connecting portion 24 and the third connecting portion 26 and the reference surface portion 20 is not changed, the adjustment surface portion 23 is bent so as to have the first line L1 as the supporting point and the second lens barrel 4 is inclined in the second direction on the basis of the first line L1.

On the contrary, if the spacer 36, which have a thickness which is thicker than the thickness of the spacer 37 which is disposed between the third connecting portion 26 and the reference surface portion 20 and the thickness of the spacer 35 which is disposed between the first connecting portion 24 and the reference surface portion 20, is disposed between the second connecting portion 25 and the reference surface portion 20, the distance between the second connecting portion 25 and the reference surface portion 20 is greater than the distance between the third connecting portion 26 and the reference surface portion 20 and the distance between the first connecting portion 24 and the reference surface portion 20. When the distance between the second connecting portion 25 and the reference surface portion 20 is great, since the distance between the first connecting portion 24 and the third connecting portion 26 and the reference surface portion 20 is not changed, the adjustment surface portion 23 is bent so as to have the first line L1 as the supporting point and the second lens barrel 4 is inclined in the second direction on the basis of the first line L1.

In this way, due to the optical axis adjustments in the first direction and the second direction being performed, the optical axis P of the second lens barrel 4 can be parallel to the optical axis of the first lens barrel 3.

In addition, in the imaging apparatus according to the second embodiment, since the spacer 37 is disposed between the third connecting portion 26 of the adjustment surface portion 23 and the reference surface portion 20, due to the fact that the spacers 35, 36, and 37 having a suitable thickness are disposed between the adjustment surface portion 23 and the reference surface portion 20, the position of the second lens barrel 4 in the optical axis direction can be adjusted.

In the imaging apparatus according to the second embodiment described above, since the third connecting portion 26 is installed in the adjustment surface portion 23 and the spacer 37 is disposed between the third connecting portion 26 and the reference surface portion 20, the position adjustment of the second lens barrel 4 in the optical axis direction can be performed, and position accuracy between the first lens barrel 3 and the second lens barrel 4 can be improved.

Moreover, similarly to the modification of the first embodiment, in the imaging apparatus in the second embodiment, the slit 23c, the notch 23d, or the groove may be formed in the periphery of the fixing portion 34 of the adjustment surface portion 23 in the adjustment metal sheet 21.

Due to the slit 23c, the notch 23d, or the groove being formed in the periphery of the fixing portion 34, the adjustment surface portion 23 is easily bent so as to have the fixing portion 34 as the supporting point in the optical axis adjustment, and the optical axis adjustment can be easily performed.

In addition, it is preferable that the slit 23c, the notch 23d, or the groove formed on the periphery of the fixing portion 34 is formed on the first line L1 or the second line L2.

Since the bending direction of the adjustment surface portion 23 is the first direction or the second direction, due to the fact that the slit 23c, the notch 23d, or the groove is formed on the first line L1 or the second line L2, improved flexibility of the adjustment surface portion 23 can be secured, and the optical axis adjustment can be further easily performed.

Figure 19:
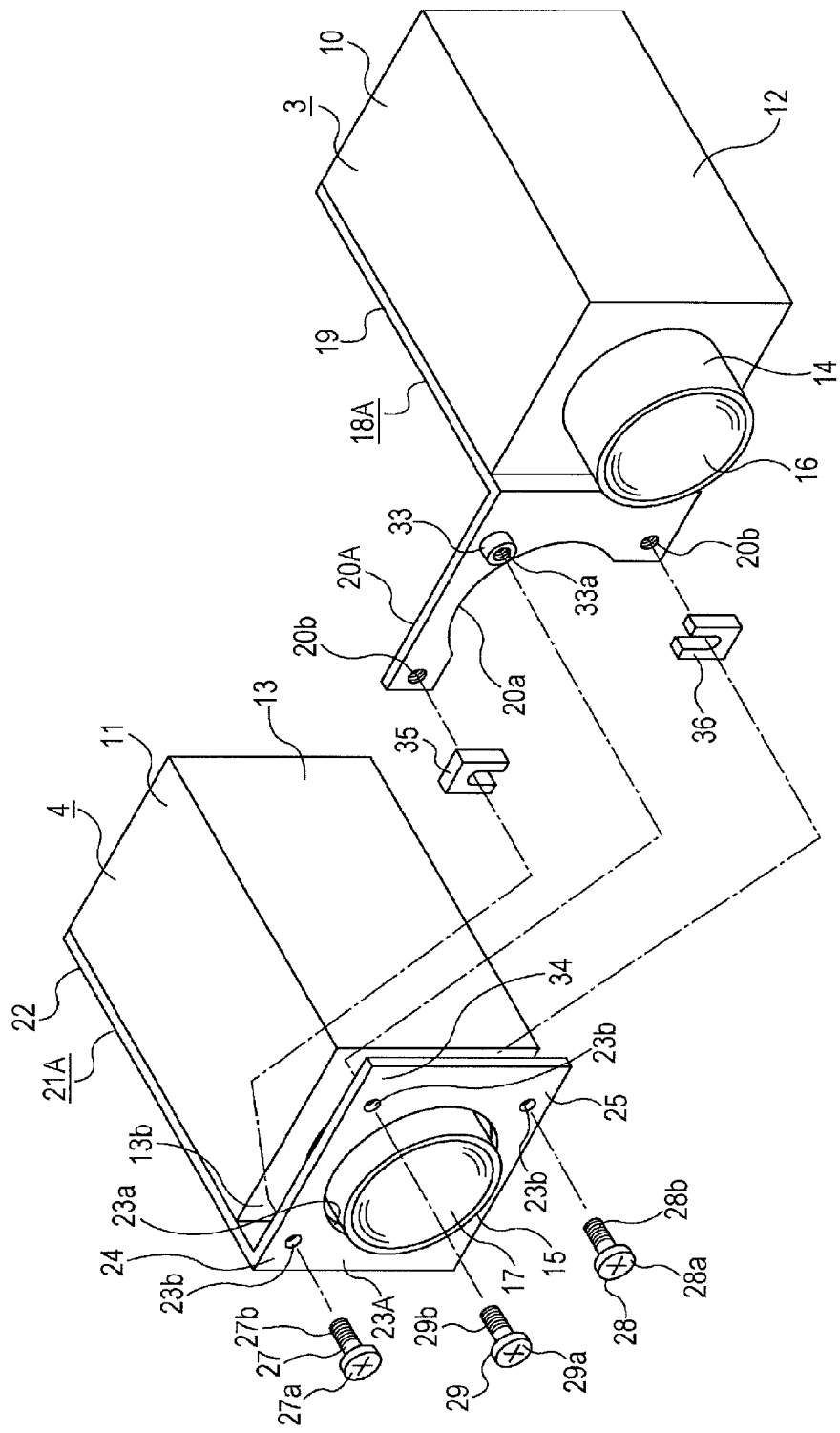
FIG. 19 illustrates a modification of the second embodiment along with FIG. 20, and is a perspective view in which the first lens barrel and the second lens barrel are separated from each other and illustrated.
Figure 20:
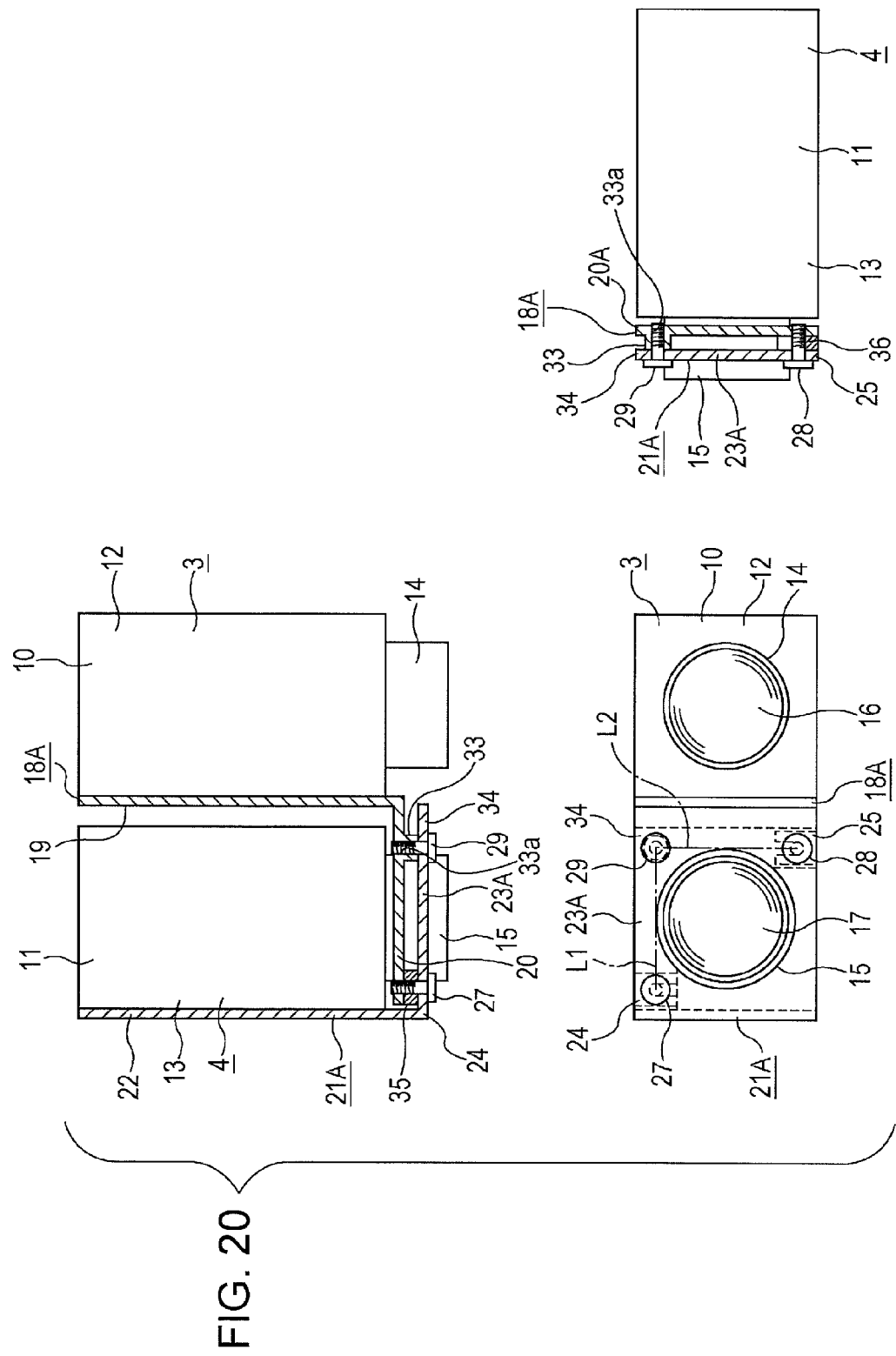
FIG. 20 is a view in which a portion of the first lens barrel and the second lens barrel or the like is cross-section and which views from above, the front, and the side.

Configuration of Imaging Apparatus according to Modification of Second Embodiment Hereinafter, configuration of a modification of the imaging apparatus according to the second embodiment will be described (refer to FIGS. 19 and 20).

In addition, only difference between the imaging apparatus according to the modification described below and the imaging apparatus of the above-described second embodiment is that the third connecting of the adjustment surface portion is installed as a fixing portion in the imaging apparatus of the modification. Therefore, only parts other than the imaging apparatus of the second embodiment are described in detail, and other parts are denoted by the same reference numbers as those of the imaging apparatus of the above-described second embodiment and the descriptions thereof are omitted.

A sheet metal for reference 18A is mounted on one side surface 12a of the main body portion 12 in the barrel portion 10 of the first lens barrel portion 3, for example, on the right side surface thereof. The sheet metal for reference 18A includes the mounted surface portion 19 which faces the left and right direction and the reference surface portion 20A which is protruded from the front end of the mounted surface portion 19 to the right side.

For example, the reference surface portion 20A is formed in an L-shape, and a portion of the inner periphery thereof is formed as the arcuate notch 20a. The connecting screw holes 20b and 20b each are formed in two corners in the upper right and the lower left of the reference surface portion 20A. The fixing cylindrical boss 33 which is protruded to the front is installed in the corner in the upper left of the reference surface portion 20A. The fixing screw hole 33a which is inserted and penetrated in the front and rear side is formed in the inner peripheral surface of the fixing boss 33.

The sheet metal for adjustment 21A is mounted on one side surface 13a of the main body portion 13 in the barrel portion 11 of the second lens barrel portion 4, for example, to right side surface thereof. The sheet metal for adjustment 21A includes a base surface portion 22 which faces the left and right direction and an adjustment surface portion 23A which is protruded from the front end of the base surface portion 22 to the left side.

The adjustment surface portion 23A is formed in a rectangular shape and includes a through-hole 23a which is penetrated in the front and rear side. For example, screw through-holes 23b, 23b, and 23b each are formed in three corners excluding the lower right corner of the adjustment surface portion 23A. The corner of the right side of the adjustment surface portion 23A is installed as a first connecting portion 24, the corner of the down side of the adjustment surface portion 23A is installed as a second connection portion 25, and the corner of the upper left of the adjustment surface portion 23A is installed as a fixing portion 34.

A line, which connects the center of the screw through-hole 23b formed in the first connection portion 24, that is, the center of a screw member 27 which inserts and penetrates the screw through-hole 23b, and the center of the screw through-hole 23b formed in the fixing portion 34, that is, the center of a screw member 29 which inserts and penetrates the screw through-hole 23b, is formed as the first line L1. A line, which connects the center of the screw through-hole 23b formed in the second connection portion 25, that is, the center of the screw member 28 which inserts and penetrates the screw through-hole 23b, and the center of the screw through-hole 23b formed in the fixing portion 34, that is, the center of the screw member 29 which inserts and penetrates the screw through-hole 23b, is formed as a second line L2. The first line L1 is extended in the left and right direction, the second line L2 is extended in the up and down direction, and the first line L1 and the second line L2 are perpendicular to each other. For example, the length of the first line L1 is the same as that of the second line L2.

The adjustment surface portion 23A is positioned in a state of being separated from the front surface 13b in the front of the front surface 13b of the main body portion 13. The lens holding portion 15 of the barrel portion 11 is inserted to the through-hole 23a of the adjustment surface portion 23A.

The reference surface portion 20A of the reference metal sheet 18A is inserted between the front surface 13b of the main body portion 13 of the second lens barrel 4 and the adjustment surface portion 23A of the adjustment metal sheet 21A.

In the state where the reference surface portion 20A is inserted between the front surface 13b of the main body portion 13 and the adjustment surface portion 23A of the adjustment metal sheet 21A, the lens holding portion 15 of the barrel portion 11 is positioned in the inner side of the notch 20a of the reference surface portion 20A. Moreover, in the state where the reference surface portion 20A is inserted between the front surface 13b and the adjustment surface portion 23A, the connecting screw holes 20b and 20b and the fixing hole 33a each formed in the reference surface portion 20A are positioned just behind the screw through-holes 23b, 23b, and 23b formed in the adjustment surface portion 23A.

The adjustment surface portion 23A is connected to the reference surface portion 20A by screw members 27, 28, and 29.

The screw shaft portions 27b, 28b, and 29b of the screw members 27, 28, and 29 each are inserted and penetrated to the screw thorough-holes 23b, 23b, and 23b of the adjustment surface portion 23A and screwed to the connecting screw holes 20b and 20b and the fixing hole 33a of the reference surface portion 20A. Therefore, the adjustment surface portion 20A is connected to the reference surface portion 23A. At this time, the rear surface of the adjustment surface portion 23A strikes the front surface of the fixing boss 33 installed on the reference surface portion 20A, and the fixing portion 34 is fixed to the reference surface portion 20A.

When the screw shaft portions 27b, 28b, and 29b of the screw members 27, 28, and 29 each are screwed to the connecting screw holes 20b and 20b, the screw shaft portions 27b and 28b each are inserted and penetrated to the spacer 35 and 36, and the spacers 35 and 36 each are positioned between the reference surface portion 20A and the adjustment surface portion 23A.

Optical Axis Adjustment of Second Lens Barrel in Imaging Apparatus According to Modification Hereinafter, an optical axis adjustment of the second lens barrel 4 in the imaging apparatus according to the modification will be described.

First, the optical axis adjustment in the first direction (yawing direction) will be described.

The optical axis adjustment in the first direction is performed by disposing the spacer 35 having a desired thickness between the first connecting portion 24 and the reference surface portion 20.

For example, if the spacer 35, which have a thickness which is thinner than the thickness of the spacer 37 which is disposed between the third connecting portion 26 and the reference surface portion 20 and the thickness of the spacer 36 which is disposed between the second connecting portion 25 and the reference surface portion 20, is disposed between the first connecting portion 24 and the reference surface portion 20, the distance between the first connecting portion 24 and the reference surface portion 20 is smaller than the distance between the third connecting portion 26 and the reference surface portion 20 and the distance between the second connecting portion 25 and the reference surface portion 20. When the distance between the first connecting portion 24 and the reference surface portion 20 is small, since the distance between the second connecting portion 25 and the third connecting portion 26 and the reference surface portion 20 is not changed, the adjustment surface portion 23 is bent so as to have the second line L2 as the supporting point and the second lens barrel 4 is inclined in the first direction on the basis of the second line L2.

On the contrary, if the spacer 35, which have a thickness which is thicker than the thickness of the spacer 37 which is disposed between the third connecting portion 26 and the reference surface portion 20 and the thickness of the spacer 36 which is disposed between the second connecting portion 25 and the reference surface portion 20, is disposed between the first connecting portion 24 and the reference surface portion 20, the distance between the first connecting portion 24 and the reference surface portion 20 is greater than the distance between the third connecting portion 26 and the reference surface portion 20 and the distance between the second connecting portion 25 and the reference surface portion 20. When the distance between the first connecting portion 24 and the reference surface portion 20 is great, since the distance between the second connecting portion 25 and the third connecting portion 26 and the reference surface portion 20 is not changed, the adjustment surface portion 23 is, bent so as to have the second line L2 as the supporting point and the second lens barrel 4 is inclined in the first direction on the basis of the second line L2.

Next, the optical axis adjustment in the second direction (pitching direction) will be described.

The optical axis adjustment in the second direction is performed by disposing the spacer 36 having a desired thickness between the second connecting portion 25 and the reference surface portion 20.

For example, if the spacer 36, which have a thickness which is thinner than the thickness of the spacer 37 which is disposed between the third connecting portion 26 and the reference surface portion 20 and the thickness of the spacer 35 which is disposed between the first connecting portion 24 and the reference surface portion 20, is disposed between the second connecting portion 25 and the reference surface portion 20, the distance between the second connecting portion 25 and the reference surface portion 20 is smaller than the distance between the third connecting portion 26 and the reference surface portion 20 and the distance between the first connecting portion 24 and the reference surface portion 20. When the distance between the second connecting portion 25 and the reference surface portion 20 is small, since the distance between the first connecting portion 24 and the third connecting portion 26 and the reference surface portion 20 is not changed, the adjustment surface portion 23 is bent so as to have the first line L1 as the supporting point and the second lens barrel 4 is inclined in the second direction on the basis of the first line L1.

On the contrary, if the spacer 36, which have a thickness which is thicker than the thickness of the spacer 37 which is disposed between the third connecting portion 26 and the reference surface portion 20 and the thickness of the spacer 35 which is disposed between the first connecting portion 24 and the reference surface portion 20, is disposed between the second connecting portion 25 and the reference surface portion 20, the distance between the second connecting portion 25 and the reference surface portion 20 is greater than the distance between the third connecting portion 26 and the reference surface portion 20 and the distance between the first connecting portion 24 and the reference surface portion 20. When the distance between the second connecting portion 25 and the reference surface portion 20 is great, since the distance between the first connecting portion 24 and the third connecting portion 26 and the reference surface portion 20 is not changed, the adjustment surface portion 23 is bent so as to have the first line L1 as the supporting point and the second lens barrel 4 is inclined in the second direction on the basis of the first line L1.

In this way, due to the optical axis adjustments in the first direction and the second direction being performed, the optical axis P of the second lens barrel 4 can be parallel to the optical axis of the first lens barrel 3.

In the imaging apparatus according to the modification, as described above, since the spacer is not disposed between the fixing portion 34 of the adjustment surface portion 23A and the reference surface portion 20A, the optical axis adjustment of the second lens barrel 4 can be performed while decreasing the number of parts.

Moreover, similarly to the modification of the first embodiment, in the imaging apparatus of the modification of the second embodiment, the slit 23c, the notch 23d, or the groove may be formed in the periphery of the fixing portion 34 of the adjustment surface portion 23A in the adjustment metal sheet 21A.

Due to the slit 23c, the notch 23d, or the groove being formed in the periphery of the fixing portion 34, the adjustment surface portion 23A is easily bent so as to have the fixing portion 34 as the supporting point in the optical axis adjustment, and the optical axis adjustment can be easily performed.

In addition, it is preferable that the slit 23c, the notch 23d, or the groove formed on the periphery of the fixing portion 34 is formed on the first line L1 or the second line L2.

Since the bending direction of the adjustment surface portion 23A is the first direction or the second direction, due to the fact that the slit 23c, the notch 23d, or the groove is formed on the first line L1 or the second line L2, improved flexibility of the adjustment surface portion 23A can be secured, and the optical axis adjustment can be further easily performed.

Effect of Imaging Apparatus in Second Embodiment

In the above-described second embodiment, a plurality of screw members 27, 28, and 29 and a plurality of spacers 35, 36, and 37 are provided as the adjustment section.

Accordingly, the optical axis adjustment of the second lens barrel 4 can be performed by simple configuration, and therefore, the optical axis adjustment of the second lens barrel 4 can be performed without increasing manufacturing costs.

In addition, in the second embodiment, since the spacers 35, 36, and 37 having an approximately U-shape are installed as the adjustment section, there is a concern that the spacers 35, 36, and 37 may fall out due to impact by dropping or the like.

Thus, a convexo-concave portion such as reticulum or the like may be formed in the surface in which the spacers 35, 36, and 37 contact the reference surface portions 20 and 20A or the adjustment surface portions 23 and 23A, therefore, the friction force may be enhanced, and the falling out of the spacers 35, 36, and 37 during occurrence of an impact or the like may be prevented. Moreover, on the contrary, a convexo-concave portion such as reticulum or the like may be formed in the surface in which the reference surface portions 20 and 20A or the adjustment surface portions 23 and 23A contact the spacers 35, 36, and 37, therefore, the friction force may be enhanced, and the falling out of the spacers 35, 36, and 37 during occurrence of an impact or the like may be prevented.

Other Configuration in Second Embodiment

Figure 21:
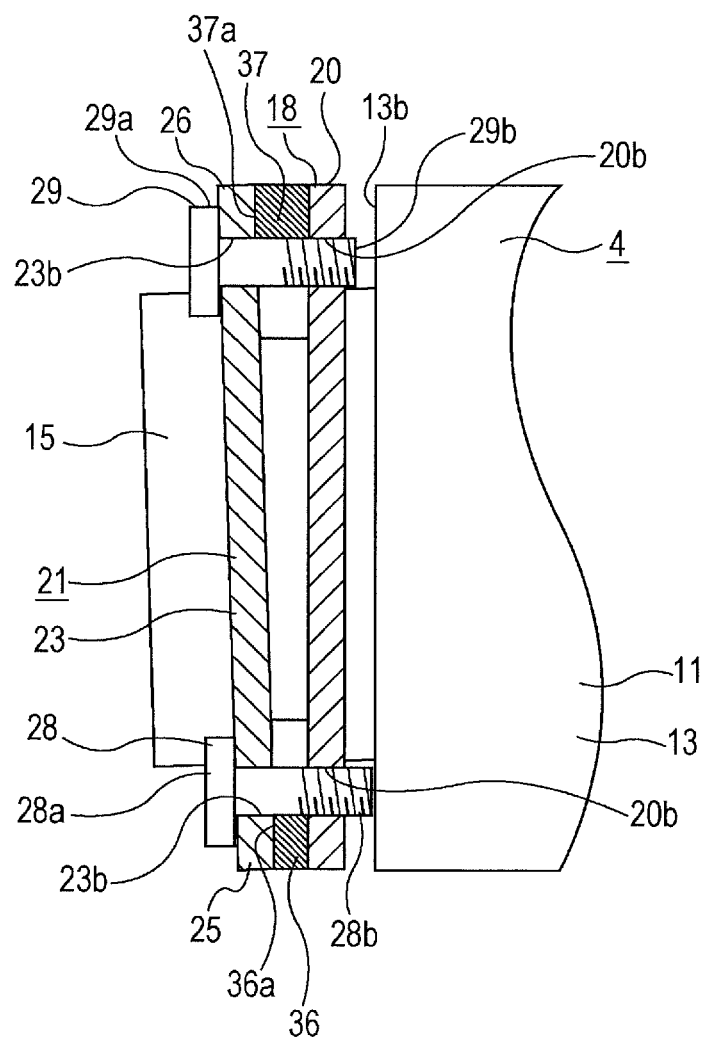
FIG. 21 is a partial cross-sectional side view illustrating an example in which spacers having inclined surfaces are disposed.

In the above-described second embodiment, the spacers 35, 36, and 37 are used as the adjustment section. However, the front surfaces or the rear surfaces of the spacers 35, 36, and 37 may be formed as inclined surfaces 35a, 36a, and 37a (refer to FIG. 21). Moreover, in FIG. 21, only the spacers 36 and 37 each having the inclined surfaces 36a and 37a are illustrated.

Due to the front surfaces or the rear surfaces of the spacers 35, 36, and 37 being formed as the inclined surfaces 35a, 36a, and 37a, it is possible to dispose the spacers 35, 36, and 37 so that the inclined surfaces 35a, 36a, and 37a follow the inclined angle of the adjustment surface portion 23 and 23A when the optical axis adjustment is performed.

Accordingly, load with respect to the adjustment surface portion 23 and 23A and the spacers 35, 36, and 37 is decreased, and it is possible to secure a stable disposition state of the adjustment surface portion 23 and 23A and the spacers 35, 36, and 37.

The Others

In the above, the example in which the reference metal sheets 18 and 18A are mounted on the first lens barrel 3 and the adjustment metal sheets 21 and 21A are mounted on the second lens barrel 4 is described. However, for example, the reference metal, sheets 18 and 18A can be integrally formed to the first lens barrel 3, and the adjustment metal sheets 21 and 21A can be integrally formed to the second lens barrel 4.

In this way, due to the fact that the reference metal sheets 18 and 18A can be integrally formed to the first lens barrel 3 and the adjustment metal sheets 21 and 21A can be integrally formed to the second lens barrel 4, reduction of the manufacturing cost can be improved through decreasing of the number of parts.

In addition, in the above, the example in which the reference surface portions 20 and 20A and the adjustment surface portions 23 and 23A are disposed at the front of the second lens barrel 4 is described. However, the reference surface portions 20 and 20A and the adjustment surface portions 23 and 23A may be disposed at the rear of the second lens barrel 4.

Moreover, the reference metal sheets 18 and 18A and the adjustment metal sheets 21 and 21A may function as a radiator plate for discharging heat generated in the first lens barrel 3 and the second lens barrel 4 outside.

Conclusion

As described above, the imaging apparatus of the first embodiment and the imaging apparatus of the second embodiment include the first lens barrel 3, the second lens barrel 4 which is disposed side by side with the first lens barrel 3, the reference metal sheets 18 and 18A which include the reference surface portions 20 and 20A, the adjustment metal sheets 21 which includes the adjustment surface portions 23 and 23A, and the adjustment section which performs the optical axis adjustment.

Accordingly, since the direction of the optical axis is adjusted by changing the direction of the adjustment surface portions 23 and 23A with respect to the reference surface portions 20 and 20A, the optical axis adjustment can be performed using a simple adjustment mechanism, and image quality can be improved without increasing manufacturing costs.

In addition, since the reference metal sheet 18 and the adjustment metal sheet 21 each are mounted on the side surface 12a of the main body portion 12 of the first lens barrel 3 and the side surface 13a of the main body portion 13 of the second lens barrel 4, the first lens barrel 3 and the second lens barrel 4 can use the same as each other, and reduction of the manufacturing cost can be improved.

Moreover, since the first line L1 and the second line L2 are perpendicular to each other, the optical axis adjustment in the first direction does not interfere with the optical axis adjustment in the second direction, and the optical axis adjustment in the second direction does not interfere with the optical axis adjustment in the first direction. Therefore, mutual interference in the optical axis adjustment is avoided, and accuracy in the optical axis adjustment can be improved.

Further, due to the fact that the length of the first line L1 and the length of the second line L2 are the same as each other, variation of the optical axis with respect to the adjustment amount regarding the optical axis adjustment in the first direction and the optical axis adjustment in the second direction is the same, and ease of the optical axis adjustment can be improved.

Embodiment of Imaging Apparatus

Figure 22:
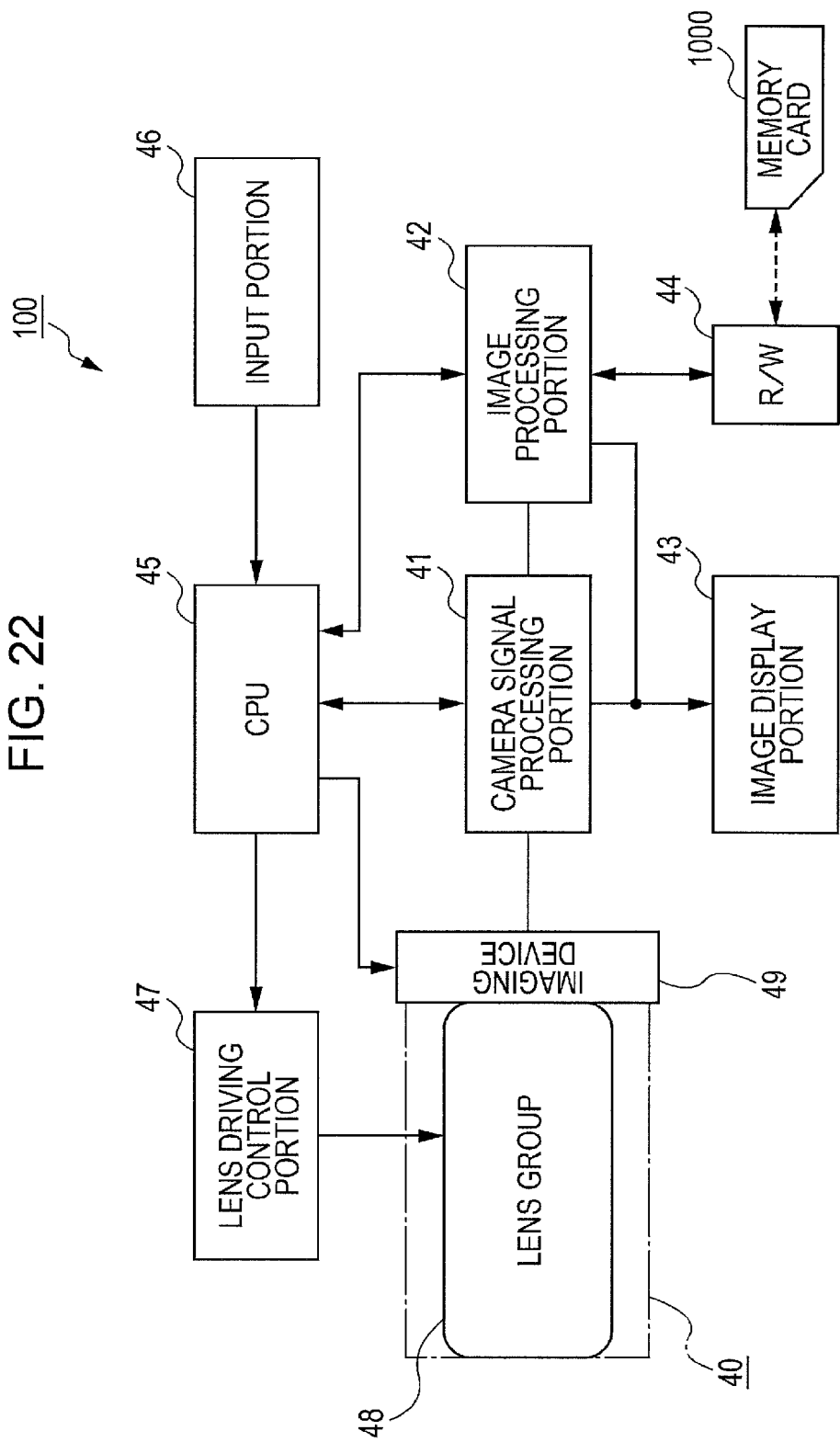
FIG. 22 is a block diagram of the imaging apparatus.

FIG. 22 is a block diagram illustrating a video camera according to an embodiment of the imaging apparatus of the present disclosure.

The imaging apparatus (video camera) 100 includes a camera block 40 which performs an imaging function, a camera signal processing portion 41 which performs signal processings such as a analog-digital conversion of a photographed image signal, and an image processing portion 42 which performs a recording reproduction processing of an image signal. In addition, the imaging apparatus 100 includes an image display portion 43 such as a liquid crystal panel which displays the photographed image or the like, a R/W (reader/writer) 44 which performs reading and writing of the image signal to a memory card 1000, a CPU (Central Processing Unit) 45 which controls the entire imaging apparatus, an input portion 46 which includes various switches in which a desired operation is performed by an user or the like, and a lens driving control portion 47 which controls driving of lens disposed in the camera block 40.

The camera block 40 includes an optical system including a lens group 48, or an imaging device 49 such as a CCD (Charge Coupled Device) or a CMOS (Complementary Metal Oxide Semiconductor), and the like.

The camera signal processing portion 41 performs various signal processings such as conversion of an output signal from the imaging device 49 to digital signal, noise removal, image quality correction, and conversion to luminance signal and color difference signal.

The image processing portion 42 performs compression coding of image signal and decompression decoding processing based on a predetermined image data format, or conversion processing of data specifications such as resolution, and the like.

The image display portion 43 includes functions which display various data such as an operation condition of user to the input portion 46 or the photographed image.

The R/W 44 performs writing of image data encoded by the image processing portion 42 to the memory card 1000 and reading of the image data recorded on the memory card 1000.

The CPU 45 functions a control processing portion which controls each circuit block installed on the imaging apparatus 100, and controls each circuit block based on an instruction input signal or the like from the input portion 46.

For example, the input portion 46 includes a shutter release button for performing a shutter operation, a selection switch for selecting the operation mode, or the like, and outputs the instruction input signal according to the user operation to the CPU 45.

The lens driving control portion 47 controls a motor (not illustrated) or the like which drives each lens of the lens group 48 based on the control signal from the CPU 45.

For example, the memory card 1000 is a semiconductor memory which can be attached to and detached from the slot connected to the R/W 44.

Hereinafter, operation in the imaging apparatus 100 will be described.

In a standby state of the capturing, under control of the CPU 45, the image signal photographed in the camera block 40 is output to the image display portion via the camera signal processing portion 41 and displayed as a camera through-image. In addition, if the instruction input signal for zooming is input from the input portion 46, the CPU 45 outputs a control signal to the lens driving control portion 47, and a predetermined lens of the lens group 48 moves based on the control of the lens driving control portion 47.

If the shutter (not illustrated) of the camera block 40 is operated by the instruction input signal from the input portion 46, the photographed image signal is output from the camera signal processing portion 41 to the image processing portion 42 and subjected to compression encoding processing, and converted into the digital data of a predetermined data format. The converted data is output to the R/W 44 and written on the memory card 1000.

In addition, focusing is performed due to the lens driving control portion 47 moving a predetermined lens of the lens group 48 based on the control signal from the CPU 45.

When the image data recorded on the memory card 1000 is reproduced, a predetermined image data is read from the memory card 1000 by the R/W 44 according to the operation with respect to the input portion 46, the reproduction image signal is output to the image display portion 43 and the reproduction image is displayed after the decompression decoding processing is performed by the image processing portion 42.

Specified shape and configuration of each portion in the above-described preferred embodiments are only the example which is specified when the present disclosure is embodied. Therefore, the technical range of the present disclosure should not be interpreted to be limited by the specified shape and configuration.

The present disclosure contains subject matter related to that disclosed in Japanese Priority Patent Application JP 2010-293692 filed in the Japan Patent Office on Dec. 28, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
a first lens barrel extending along and about a first lens barrel optical axis;
a second lens barrel extending along and about a second lens barrel optical axis that is disposed side by side with the first lens barrel in a direction perpendicular to the first lens barrel optical axis;
a reference metal sheet formed in an L-shape and including a mounted surface portion mounted on a surface perpendicular to the first lens barrel optical axis and a reference surface portion integrally connected perpendicularly to the mounted surface portion and having a hole formed therethrough that surrounds the first lens barrel optical axis;
an adjustment metal sheet formed in an inverted L-shape and including a base surface portion mounted on a surface perpendicular to the second lens barrel optical axis and an adjustment surface portion integrally connected perpendicularly to the base surface portion and extending away from the second lens barrel optical axis; and
an adjustment section operative to releasably connect the reference metal sheet and the adjustment metal sheet together at the adjustment surface portion and the reference surface portion when the adjustment surface portion and the reference surface portion are in facial opposition to each other and to adjust orientation of the first and second lens barrel optical axes relative to one another by adjusting the position of the adjustment surface portion and the reference surface portion relative to one another.

2. The imaging apparatus according to claim 1,
wherein the adjustment section includes a plurality of screw members which connects the reference surface portion and the adjustment surface portion, and a plurality of spring members which is disposed between the reference surface portion and the adjustment surface portion and biases the adjustment surface portion in a direction which is separated from the reference surface portion in a second lens barrel optical axis direction.

3. The imaging apparatus according to claim 2,
wherein the adjustment surface portion includes a fixing portion which is fixed to the reference surface portion by the screw member, a first connecting portion which is connected to the reference surface portion by the screw member, and a second connecting portion which is connected to the reference surface portion by the screw member,
the spring member is disposed between the first connecting portion and the reference surface portion, and
the spring member is disposed between the second connecting portion and the reference surface portion.

4. The imaging apparatus according to claim 3,
wherein when a line connecting a center of the screw member fastened to the fixing portion and a center of the screw member fastened to the first connecting portion is a first line, and a line connecting a center of the screw member fastened to the fixing portion and a center of the screw member fastened to the second connecting portion is a second line,
the first line and the second line are perpendicular to each other.

5. The imaging apparatus according to the claim 4,
wherein length of the first line is the same as that of the second line.

6. The imaging apparatus according to claim 4,
wherein a slit, a notch, or a groove is formed on the first line or the second line, or the first line and the second line in the second lens barrel.

7. The imaging apparatus according to claim 3,
wherein a slit, a notch, or a groove is formed in a periphery of the fixing portion in the second lens barrel.

8. The imaging apparatus according to claim 2,
wherein a compression coil spring is used as the spring member, and
the screw member is inserted and penetrated to the spring member.

9. The imaging apparatus according to claim 2,
wherein the adjustment surface portion includes a first connecting portion which is connected to the reference surface portion by the screw member, a second connecting portion which is connected to the reference surface portion by the screw member, and a third connecting portion which is connected to the reference surface portion by the screw member,
the spring member is disposed between the first connecting portion and the reference surface portion,
the spring member is disposed between the second connecting portion and the reference surface portion, and
the spring member is disposed between the third connecting portion and the reference surface portion.

10. The imaging apparatus according to claim 9,
wherein when a line connecting a center of the screw member fastened to the third connecting portion and a center of the screw member fastened to the first connecting portion is a first line, and a line connecting a center of the screw member fastened to the third connecting portion and a center of the screw member fastened to the second connecting portion is a second line,
the first line and the second line are perpendicular to each other.

11. The imaging apparatus according to the claim 10,
wherein length of the first line is the same as that of the second line.

12. The imaging apparatus according to claim 1,
wherein the adjustment section includes a plurality of screw members which connects the reference surface portion and the adjustment surface portion, and a plurality of spacers which is disposed between the reference surface portion and the adjustment surface portion, interposed between the reference surface portion and the adjustment surface portion, and each has a predetermined thickness in the interposing direction.

13. An imaging apparatus comprising:
a first lens barrel;
a second lens barrel that is disposed side by side with the first lens barrel in a direction perpendicular to an optical axis of the first lens barrel;
a reference metal sheet that includes a mounted surface portion mounted on a surface perpendicular to the optical axis of the first lens barrel and a reference surface portion facing an optical axis direction;
an adjustment metal sheet that includes a base surface portion mounted on a surface perpendicular to an optical axis of the second lens barrel and an adjustment surface portion which faces an optical axis direction and is positioned side by side with the reference surface portion in a state of being separated in the optical axis direction; and an adjustment section that changes a direction of the adjustment surface portion with respect to the reference surface portion and adjusts a direction of the optical axis of the second lens barrel, wherein the adjustment section includes a plurality of screw members which connects the reference surface portion and the adjustment surface portion, and a plurality of spacers which is disposed between the reference surface portion and the adjustment surface portion, interposed between the reference surface portion and the adjustment surface portion, and each has a predetermined thickness in the interposing direction, and wherein the adjustment surface portion includes a fixing portion which is fixed to the reference surface portion by the screw member, a first connecting portion which is connected to the reference surface portion by the screw member, and a second connecting portion which is connected to the reference surface portion by the screw member, the spacer is disposed between the first connecting portion and the reference surface portion, and the spacer is disposed between the second connecting portion and the reference surface portion.

14. The imaging apparatus according to claim 13, wherein when a line connecting a center of the screw member fastened to the fixing portion and a center of the screw member fastened to the first connecting portion is a first line, and a line connecting a center of the screw member fastened to the fixing portion and a center of the screw member fastened to the second connecting portion is a second line, the first line and the second line are perpendicular to each other.

15. The imaging apparatus according to the claim 14, wherein length of the first line is the same as that of the second line.

16. The imaging apparatus according to claim 14, wherein a slit, a notch, or a groove is formed on the first line or the second line, or the first line and the second line in the second lens barrel.

17. The imaging apparatus according to claim 13, wherein a slit, a notch, or a groove is formed in a periphery of the fixing portion in the second lens barrel.

18. An imaging apparatus comprising:

a first lens barrel;

a second lens barrel that is disposed side by side with the first lens barrel in a direction perpendicular to an optical axis of the first lens barrel;

a reference metal sheet that includes a mounted surface portion mounted on a surface perpendicular to the optical axis of the first lens barrel and a reference surface portion facing an optical axis direction;

an adjustment metal sheet that includes a base surface portion mounted on a surface perpendicular to an optical axis of the second lens barrel and an adjustment surface portion which faces an optical axis direction and is positioned side by side with the reference surface portion in a state of being separated in the optical axis direction; and an adjustment section that changes a direction of the adjustment surface portion with respect to the reference surface portion and adjusts a direction of the optical axis of the second lens barrel wherein the adjustment section includes a plurality of screw members which connects the reference surface portion and the adjustment surface portion, and a plurality of spacers which is disposed between the reference surface portion and the adjustment surface portion, interposed between the reference surface portion and the adjustment surface portion, and each has a predetermined thickness in the interposing direction, and wherein the adjustment surface portion includes a first connecting portion which is connected to the reference surface portion by the screw member, a second connecting portion which is connected to the reference surface portion by the screw member, and a third connecting portion which is connected to the reference surface portion by the screw member, the spacer is disposed between the first connecting portion and the reference surface portion, the spacer is disposed between the second connecting portion and the reference surface portion, and the spacer is disposed between the third connecting portion and the reference surface portion.

19. The imaging apparatus according to claim 18, wherein when a line connecting a center of the screw member fastened to the third connecting portion and a center of the screw member fastened to the first connecting portion is a first line, and a line connecting a center of the screw member fastened to the third connecting portion and a center of the screw member fastened to the second connecting portion is a second line, the first line and the second line are perpendicular to each other.

20. The imaging apparatus according to the claim 19, wherein length of the first line is the same as that of the second line.

* * * * *